US011207989B2

(12) United States Patent
Gao et al.

(10) Patent No.: US 11,207,989 B2
(45) Date of Patent: Dec. 28, 2021

(54) WIRELESS CHARGING OF ELECTRIC VEHICLES

(71) Applicant: University of Georgia Research Foundation, Inc., Athens, GA (US)

(72) Inventors: Yabiao Gao, Athens, GA (US); Aleff A. Oliveira, Distrito Federal (BR); Tsz-Ho Tse, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 449 days.

(21) Appl. No.: 16/086,042

(22) PCT Filed: Mar. 22, 2017

(86) PCT No.: PCT/US2017/023634
§ 371 (c)(1),
(2) Date: Sep. 18, 2018

(87) PCT Pub. No.: WO2017/165549
PCT Pub. Date: Sep. 28, 2017

(65) Prior Publication Data
US 2020/0290467 A1    Sep. 17, 2020

Related U.S. Application Data

(60) Provisional application No. 62/311,663, filed on Mar. 22, 2016.

(51) Int. Cl.
*B60L 53/12*         (2019.01)
*H02J 50/90*         (2016.01)
*H02J 50/12*         (2016.01)
*B60L 53/38*         (2019.01)
*H02J 7/02*          (2016.01)
*H02J 50/60*         (2016.01)

(52) U.S. Cl.
CPC ............... *B60L 53/12* (2019.02); *B60L 53/38* (2019.02); *H02J 7/02* (2013.01); *H02J 50/12* (2016.02); *H02J 50/90* (2016.02); *H02J 50/60* (2016.02)

(58) Field of Classification Search
CPC .... H02J 50/90; H02J 50/12; H02J 7/02; H02J 50/60; H02J 7/025; H04B 5/0037;
(Continued)

(56) References Cited

U.S. PATENT DOCUMENTS 8,344,552 B2   1/2013   Cook et al.
9,024,578 B2   5/2015   Fisher
(Continued)

FOREIGN PATENT DOCUMENTS

KR        20120054175 A       5/2012

OTHER PUBLICATIONS

International Search Report for PCT/US2017/023634 dated Aug. 2, 2017.

*Primary Examiner* — John W Poos
*Assistant Examiner* — Alex W Lam
(74) *Attorney, Agent, or Firm* — Thomas | Horstemeyer, LLP

(57) ABSTRACT

Various examples are provided related to wireless charging of electric vehicles. In one example, a wireless charging system includes a transmitter pad including a primary coil supplied by a power source, and alignment control circuitry configured to determine an alignment condition of the transmitter pad with respect to a receiver pad of an electric vehicle. In another example, a wireless charging system includes a receiver pad including a secondary coil; and alignment processing circuitry configured to determine an alignment condition of the receiver pad with respect to a transmitter pad comprising a primary coil supplied by a power source. In another example, a method includes measuring output voltages of a plurality of auxiliary coils mounted on a secondary coil located over a primary coil of (Continued)

the wireless charging system and determining a lateral misalignment between the primary and secondary coils using the output voltages.

20 Claims, 22 Drawing Sheets

(58) Field of Classification Search
CPC ..... H04B 5/0081; H04B 5/0093; B60L 53/12; B60L 53/38
See application file for complete search history.

(56) References Cited

U.S. PATENT DOCUMENTS

| | | |
|---|---|---|
| 2010/0259217 A1 | 10/2010 | Baarman et al. |
| 2011/0163542 A1 | 7/2011 | Farkas |
| 2013/0049484 A1 | 2/2013 | Weissentern et al. |
| 2013/0127411 A1* | 5/2013 | Ichikawa ................ H01F 38/14 320/108 |
| 2013/0241476 A1* | 9/2013 | Okada ................... B60L 53/124 320/108 |
| 2014/0028110 A1 | 1/2014 | Petersen et al. |
| 2014/0103873 A1* | 4/2014 | Partovi .............. G06K 19/0704 320/108 |
| 2015/0073642 A1 | 3/2015 | Widmer et al. |
| 2015/0094887 A1* | 4/2015 | Kawashima ........... H02J 50/90 701/22 |
| 2015/0115733 A1 | 4/2015 | Sealy et al. |
| 2015/0155095 A1 | 6/2015 | Wu et al. |
| 2015/0270739 A1 | 9/2015 | Keeling et al. |
| 2016/0031330 A1 | 2/2016 | Ishigaki |
| 2016/0059723 A1* | 3/2016 | Kim ....................... B60L 53/38 320/108 |
| 2018/0083349 A1* | 3/2018 | Sieber ..................... B60L 53/65 |
| 2018/0236879 A1* | 8/2018 | Elshaer ................ G01R 31/006 |

\* cited by examiner

P = Primary coil center
S = Secondary coil center
L = Left aux. coil
R = Right aux. coil
F = Forward aux. coil
B = Backward aux. coil

SPECIFICATIONS OF THE PRIMARY, SECONDARY AND AUXILIARY COILS

| Specification | Primary | Secondary | Auxiliary |
|---|---|---|---|
| Inductance (µH) | 65.3 | 65.1 | 17.1 |
| Resonant capacitance (µF) | 1.0 | 1.0 | 3.7 |
| Number of turns | 12 | 12 | 10 |
| Inside Diameter of coil (mm) | 110 | 110 | 13 |
| Outside Diameter of coil (mm) | 560 | 560 | 51.5 |
| Coil track width (mm) | 9.5 | 9.5 | 1.0 |
| Coil track separation (mm) | 10.9 | 10.9 | 1.0 |
| Resonant capacitance (µF) | 1.0 | 1.0 | 3.7 |
| Number of turns | 12 | 12 | 10 |
| Inside Diameter of coil (mm) | 110 | 110 | 13 |

▲ Measured value
✳ True value

▲ Measured value
✳ True value

WIRELESS CHARGING OF ELECTRIC VEHICLES

CROSS REFERENCE TO RELATED APPLICATIONS

This application is the 35 U.S.C. § 371 national stage application of PCT Application No. PCT/US2017/023634, filed Mar. 22, 2017, where the PCT claims priority to, and the benefit of, U.S. provisional application entitled "Wireless Charging of Electric Vehicles" having Ser. No. 62/311,663, filed Mar. 22, 2016, both of which are herein incorporated by reference in their entireties.

BACKGROUND

Electric vehicles (EV) have gained popularity due to environmental concerns, increasing prices of fossil fuel, and a subsequent desire to move toward renewable energy sources; however, it also raises many concerns associated with connections between EV and charger, EV infrastructure and maintenance, as well as its vulnerabilities to inclement weather and vandalism. Wireless Charging (WC), which operates on magnetic resonance for Wireless Power Transfer (WPT), allows these problems to be alleviated.

SUMMARY

Aspects of the present disclosure are related to wireless charging of electric vehicles.

In one aspect, among others, a wireless charging system for electric vehicles comprises a transmitter pad including a primary coil supplied by a power source; and alignment control circuitry configured to determine an alignment condition of the transmitter pad with respect to a receiver pad of an electric vehicle. In one or more aspects, the alignment control circuitry can be configured to set a resonant operating frequency of the power source based at least in part upon the alignment condition. The alignment control circuitry can determine a lateral distance between a center of the primary coil and a center of a secondary coil of the receiver pad based upon the resonant operating frequency. In one or more aspects, the alignment condition can be based upon a phase-angle between a voltage supplied to the primary coil by the power source and a current flowing through the primary coil. The alignment control circuitry can iteratively adjust an operating frequency of the power source until the phase-angle satisfies a threshold condition. The alignment control circuitry can further adjust the operating frequency of the power source to maintain a uniform voltage gain at an output of the receiver pad. The wireless charging system can comprise a phase-angle measurement circuit configured to generate a DC (direct current) output proportional to the phase-angle between the voltage and the current. In one or more aspects, determining the alignment condition can comprise measuring the alignment condition at different operating frequencies of the power source.

In another aspect, a wireless charging system for electric vehicles comprises a receiver pad of an electric vehicle, the receiver pad comprising a secondary coil; and alignment processing circuitry configured to determine an alignment condition of the receiver pad with respect to a transmitter pad comprising a primary coil supplied by a power source. In one or more aspects, the receiver pad can comprise a plurality of auxiliary coils distributed about the receiver pad. The plurality of auxiliary coils can consist of four auxiliary coils positioned at a fixed radius from and equally distributed about a center of the secondary coil. The fixed radius from the center of the secondary coil can correspond to a radius from a center of the primary coil where a magnetic field distribution generated by the primary coil exhibits the greatest radial rate of change. In one or more aspects, the alignment condition can be based at least in part upon comparison of measured outputs of the plurality of auxiliary coils. The plurality of auxiliary coils can be individually fabricated on a printed circuit board (PCB), which can comprise an amplifier configured to amplify an output of the auxiliary coil on that PCB. In one or more aspects, the receiver pad cam comprise an ultrasonic sensor configured to measure height between the receiver pad and a surface under the receiver pad.

In another aspect, a method for aligning a wireless charging system for vehicle charging comprises measuring output voltages of a plurality of auxiliary coils mounted on a secondary coil located over a primary coil of the wireless charging system; determining a lateral misalignment between the primary and secondary coils based at least in part upon the output voltages; and adjusting a position of the secondary coil based upon the lateral misalignment. The lateral misalignment can be based upon reducing a magnitude of the difference between the measured output voltages and a voltage vector corresponding to a secondary coil position to within a defined threshold. In one or more aspects, the method can further comprises measuring a phase-angle between a voltage and a current supplied to the primary coil by a power source; and adjusting an operating frequency of the power source supplying based at least in part upon a comparison of the phase-angle with a threshold value. The phase-angle can be measured after the secondary coil is aligned over the primary coil within a defined lateral tolerance.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
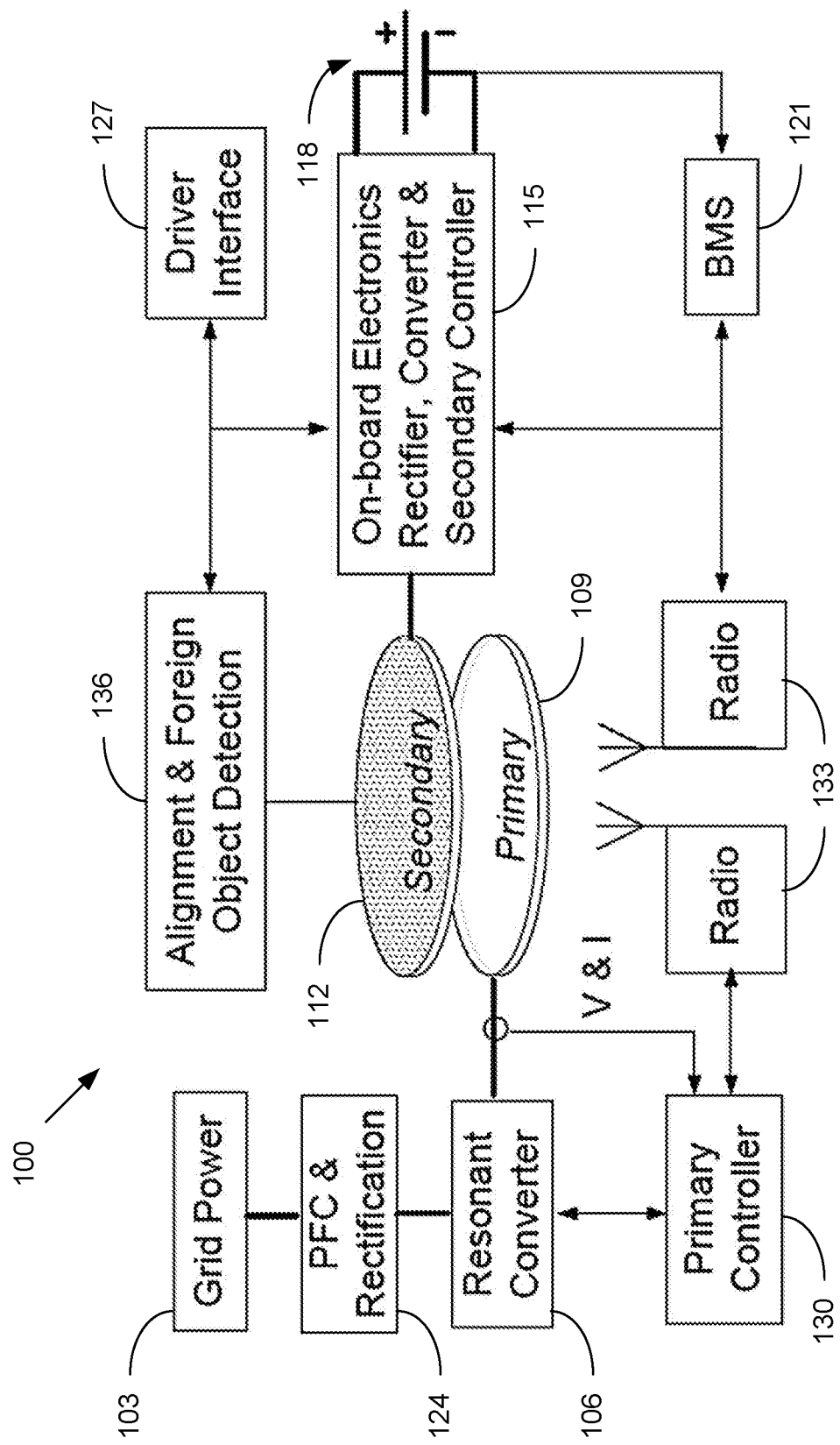
FIG. 1 is a schematic diagram illustrating an example of the components of a wireless charging system that can be used for electric vehicles, in accordance with various embodiments of the present disclosure.

Disclosed herein are various examples related to wireless charging of electric vehicles. Reference will now be made in detail to the description of the embodiments as illustrated in the drawings, wherein like reference numbers indicate like parts throughout the several views. The components in the drawings are not necessarily to scale, emphasis instead being placed upon clearly illustrating the principles of the present disclosure.

Wireless Power Transfer (WPT) is the transmission of electricity from a power source to an electrical load without physical contact. WPT is useful when a wire connection is inconvenient, unsafe or even impossible. WPT via magnetic resonance coupling provides a promising outlet for electric vehicle (EV) charging due to the non-contact manner. Conventional plug-in charging stations for EVs utilize street equipment, which carries the risk of vandalism, the degradation of electrical connections, and the safety concerns associated with using plug-in charging in heavy rain or when the car or charging station is covered in snow. In contrast, wireless charging can be deployed from the ground or below the ground with no street equipment, eliminating the hassle of repairing EV charging stations and handling unwieldy charging cables.

Unlike railway/subway transit systems where grid energy is conductively transmitted to vehicle sides by pantograph sliding plates, road network complexity and EV flexibility cannot easily allow grid energy to power the EV in a contact manner. Thus, energy dense batteries are installed on EVs in order to achieve a decent travelling range on a single charge. However, the energy density (kW/kg) of current EV batteries is about 0.8% that of gasoline, which makes it difficult to support a traveling range equal to traditional engine vehicles. Wireless EV charging through inductive power transfer (IPT) is presented in this disclosure as a convenient charging method to refuel an EV by a concept named "opportunity charging." Besides convenience, wireless charging could provide other benefits over plug-in charging through increased safety, battery volume reduction, and weather proofing.

A WPT system for EVs can include a power inverter-based power transmitter placed on and/or underneath the ground or parking surface, a power receiver mounted in and/or under the chassis of the EV, and a compact power regulating electronic circuit to charge the battery of the EV. The benefits of such a wireless charging technology include the variable frequency controller and the effective electronic circuit topology in the receiver module, which make wireless charging more stable while reducing the number of electronic elements on the power receiver. Since wireless charging stations operate without cables or above-ground stations, they can be conveniently installed in public locations without the risk of vandalism or weather-inflicted damage, improving the life span of the EV charging station. In addition, these types of wireless stations can support "opportunity charging" so that the chance of an EV being charged is increased, which can reduce the volume of the battery, extend the travel range of the EV, and lower the EV cost.

WPT allows power to be transferred from a transmitter coil (or pad) to a receiver coil (or pad) over an air gap. WPT is based on the principle of magnetic resonance couplings. The WPT system is mainly composed of a high-frequency power inverter, transmitter coil (also called "primary side"), receiver coil (also called "secondary side"), compensation capacitors, and rectification electronics. The alternating magnetic field generated by the primary side induces an alternating current in the secondary side. The rectifier converts the alternating current into direct current (DC), and then a DC-DC converter can be used to drive the desired load, for example, a battery in an EV. Compensation capacitors can make up for the large inductance leakage and allow for a loose coupling, so power can transfer wirelessly across a large air gap.

Although it seems that the non-contact aspect of wireless chargers can make the charging experience much friendlier, alignment issues can adversely affect the EV and the driver because the wireless power transmission is quite sensitive to the relative position between the transmitter and receiver pads. Often, EVs used in everyday life are not parked in the ideal position over the transmitter each time. The misalignment between the two coils influences the output voltage at the secondary side and hence affects the power delivery and efficiency. The relative position between the primary and secondary coils can be highly variable depending on the driver's parking, which can cause efficiency drop and high electric stress due to reactive power or even lack of function if the misalignment is too large.

WPT systems are frequency-sensitive due to their use of magnetic resonance and any change in the resonant characteristics, such as inductance, capacitance or load, can influence the operating frequency of the system. Since WPT systems operate in a non-contact manner, the physical spacing between the two coils can vary each time the EV is parked, resulting in a change in the magnetic coupling and eventually shifting the best switching frequency for WPT. Additionally, the chassis height might be different for different EVs, which can also influence the optimal operating conditions.

Generally, the wireless charging system can endure a maximum misalignment of 10 cm while keeping a decent efficiency. However, a previous study on drivers' parking behavior has shown that the mean longitudinal misalignment can be more than 70 cm when drivers do not receive any external parking navigation support. The study also indicated that only 5% of drivers can park their vehicles within the accepted misalignment without any additional navigation tools. Overall, a vehicle alignment system which provides coil positioning information to guide the driver's parking for efficient charging is highly desirable.

A vehicle alignment system can be used to navigate the driver or assist the driver in adjusting the vehicle during parking, improving the alignment of the two coils. The magnetic alignment can use the existing coil and frequency tracking control electronics of wireless chargers to detect the distance between the two coils while using small auxiliary coils for direction and fine adjustment. This system can provide a cost effective detection method for coil alignment in electric vehicle wireless charging (EVWC).

In addition, frequency tracking control based on voltage gain and impedance analysis across the frequency domain can be used to achieve a uniform voltage gain control through phase angle feedback at the primary side. For example, the vehicle alignment system for wireless EV charging can use and share the same transmitter to generate a magnetic field. Small coils (e.g., 4 coils) can be mounted on the receiver pads and used for field detection, and the control electronics can analyze the voltage output of the coils and identify the relative position between the transmitter and receiver pads.

A three-dimensional coil positioning technique is disclosed employing the existing primary station together with auxiliary coils (e.g., four coils) mounted on the receiver pad that can be used to navigate the driver to park perfectly for efficient WPT. The auxiliary coils work as magnetic sensors to pick up the magnetic field strength generated by the primary coil. The aim of this work is to determine the alignment by using the existing charging hardware while considering the air gap variations due to different car models or changes in weight carried by the vehicles. The vehicle alignment system can be used to allow misalignment that falls within an acceptable (or defined) range.

This alignment technology using existing hardware and magnetic detection utilizes less components and hence reduces the cost to a lower level. Moreover, the design can provide a longer detection range and support orientation detection, allowing it to dynamically navigate the driver during his/her parking over the wireless charging station. For example, the measurement principle can include mapping the output voltages of the auxiliary coils in the navigation area, and then matching the measured data with previously mapped data space. The alignment in horizontal plane and air gap can be obtained by deriving the output voltage and mutual inductance over three dimensional coordinates.

The strong electromagnetic field between the transmitter and receiver pads can also cause temperature rise in metal debris on the WPT charging pad. The amount of allowable magnetic field strength exposed to human and pets is regulated by FDA. A foreign object detection subsystem can be included to identify whether the air gap between the two pads is obstructed. Additionally, energy loss in the power inverter can be lowered through the use of charging power transistors and a soft switching algorithm to control the transistor switching. A controllable circuit breaker can be applied to isolate the coils and the alignment electronics to prevent damage to the alignment control electronics that can be caused by high power and output voltage levels that are present during wireless EV charging. Circular and non-circular coils or couplers may be used for the wireless charging. To account for the asymmetrical magnetic field distribution of non-circular coils, the alignment system can measure the magnetic field distribution across every direction to account for the charging interface variation.

Referring to FIG. 1, shown is a schematic diagram illustrating an example of the components of a wireless charging system 100 used for EVs. Grid power 103 can first be rectified to DC, then a resonant inverter 106 can convert the DC power to high frequency AC current to drive the primary coil (or pad) 109 and produce a magnetic field. According to Faraday's law of electromagnetic induction, another AC current with the same frequency as the magnetic field is induced in the secondary coil (or pad) 112 located adjacent to the primary coil 109. Additional power conversion circuitry 115 converts the high frequency circulating current from the secondary coil 112 into DC to charge a battery pack 118. The on-board electronics can comprise a rectifier, DC-DC converters, secondary controller, and a battery management system (BMS) 121, as well as sensing modules. As the AC load is not purely resistive, a phase shift between the grid voltage and current will occur, which will lower the power delivery. Thus, power factor correction (PFC) 124 can be included at the grid power input to decrease the apparent power and total current drawn from the grid 103. A driver interface 127 can be used to display the system's electrical and mechanical parameters such as charging monitoring, alignment information, and/or the presence of metal and/or living things.

The monitoring data can be transmitted to the primary controller 130 via radios 133 or other wireless communication interface (e.g., Bluetooth, WiFi, etc.) to enable, disable, and control the power delivery. In a commercial wireless EV charger, DSRC (Dedicated Short Range Communications) can be used as the wireless communication mechanism between a ground or charging station including the primary side and the vehicle (or secondary) side due to its fast response characteristics. DSRC will likely be applied widely in cars as required by the U.S. department of transportation and the SAE communications committee. The EV can communicate with a wireless charging station as long as it is within the zone where the DSRC signal is available.

An alignment system 136 can serve as a driving/parking guide thereby solving many of the misalignment issues by aiding the driver in easily park the vehicle with appropriate alignment between the primary and secondary coils 109 and 112. For wirelessly charged EVs, two parameters have significant effects on the charging: one is the existence of foreign objects over the primary station, the other is relative position between the primary and the secondary coils 109 and 112. Metal debris between the two charging coils 109 and 112 could reach high temperatures and lower the WPT efficiency. Moreover, living things should not be subjected to the strong magnetic fields produced by the primary coil 109. Thus, a foreign object detection subsystem can be included as part of the alignment system 136.

Further, the efficiency of wireless charging highly relies on the alignment condition between the two charging coils (or pads) 109 and 112. Wireless EV chargers can commonly tolerate a misalignment error of only 10 cm, which presents a challenge to EV drivers while parking over a wireless charging station. Investigation of the effects of drivers' behavior and parking alignment over wireless chargers found that the mean longitudinal misalignment is more than 70 cm when the drivers parked over a wireless charging pad with no guidance from external support. The study also showed that only 5% of EVs can park well enough to achieve efficient wireless charging. To address this effect, the operation of wireless EV charging can be split into two steps: the first includes coil alignment to ensure efficient charging; and the second includes power delivery to start charging the battery 118.

The alignment system 136 can utilize magnetic sensing for alignment in wireless EV chargers. Considering total cost and complexity of the charging system, it would be desirable to have a subsystem that could position the coils 109 and 112 by utilizing the existing wireless charging hardware. The disclosed alignment system 136 uses the charging hardware along with a plurality of auxiliary coils attached on the secondary coil 112 to measure the magnetic field and deduce the primary coil 109 coordinates. The existing charging facility is used to generate a magnetic field which can be used to sense the relative distance between the two coil centers. The existing primary coil 109 can be used to generate a weak magnetic field that can be detected by magnetic sensors installed on the secondary side. A plurality of auxiliary (or minor) coils can be installed on the secondary pad 112 for direction detection using triangulation. For example, four small alignment coils can be used to adjust the alignment when the two major coils 109 and 112 are close enough, ensuring the primary and secondary pads 109 and 112 are well aligned. In addition to the auxiliary coils, the alignment system 136 can also provide height measurements using, e.g., an ultrasonic sensor (e.g., MaxSonar-EZ2, MaxBotix Inc., Brainerd, Minn., USA). In this arrangement, the alignment system 136 shares many of the electronic components included in the charging facility, leading to a low-cost detection.

Figure 2A:
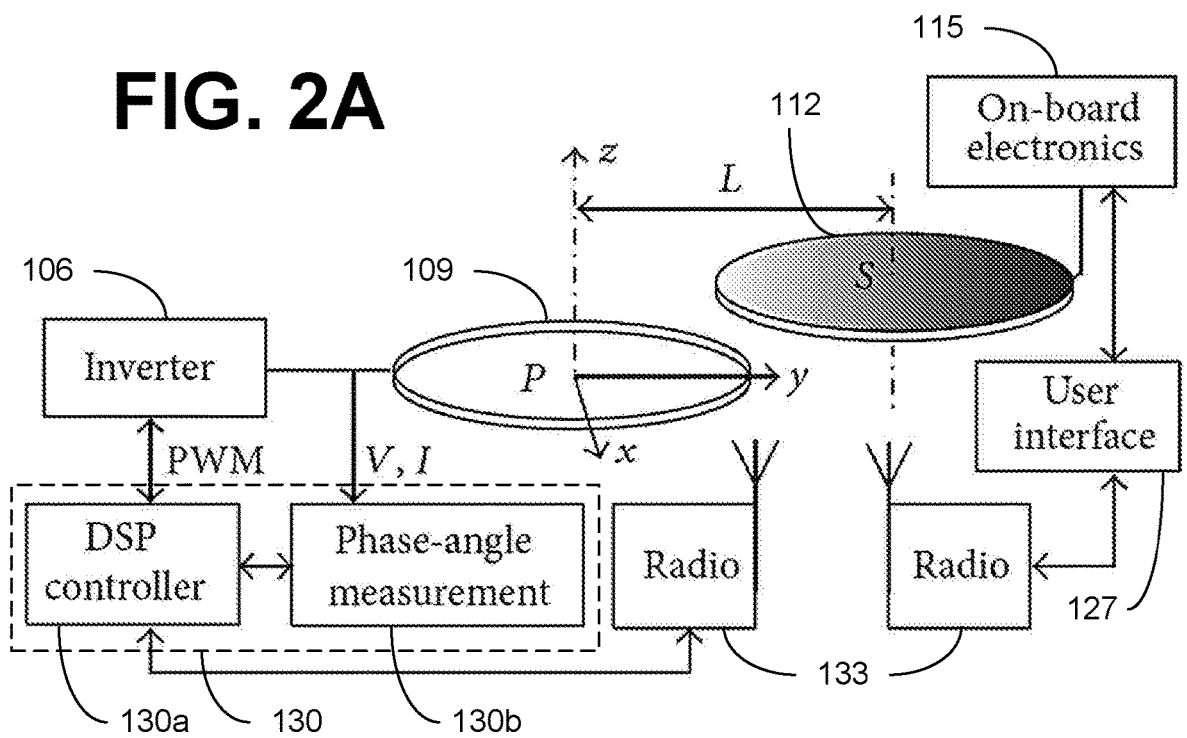
FIGS. 2A through 2D illustrate an example of an alignment detection system utilizing auxiliary coils and components of the wireless charging system of FIG. 1, in accordance with various embodiments of the present disclosure.

Referring to FIG. 2A, shown is a schematic diagram illustrating the components of the wireless charging system 100 of FIG. 1 used for alignment detection. The resonant converter 106 can be an inverter including two half-bridge insulated gate bipolar transistor (IGBT) modules (e.g., FF100R12K4, Infineon), which can be employed to form an H-bridge that drives the primary (or transmitter) coil 109 to generate high frequency electromagnetic fields. Since the phase angle between output voltage and current of the inverter changes along with the operating frequency and coil spatial distribution, the distance between the primary and secondary coils 109 and 112 can be measured by the phase-angle feedback and the frequency characteristics of the WPT system on misalignment. The voltage/current induced in the secondary (or receiver) coil 112 is rectified to DC by power conversion circuitry (or on-board electronics) 115 to power the load or charge a battery 118 (FIG. 1).

A DSP controller 130a can switch the frequency of the pulse width modulation (PWM) signals and phase-angle signals can be acquired using a phase-angle measurement module 130b, with charging information obtained from the vehicle (or secondary) side via wireless communication. For example, a National Instrument (NI) Data Acquisition (DAQ) card (e.g., NI CompactRio-9075) with wireless communication modules can be used to transmit the data between the primary (or charging system) side and secondary (or vehicle) side wirelessly. A user (or driver) interface 127, such as one developed in LabVIEW, can be used to display the alignment information for the driver while parking.

Figure 2B:
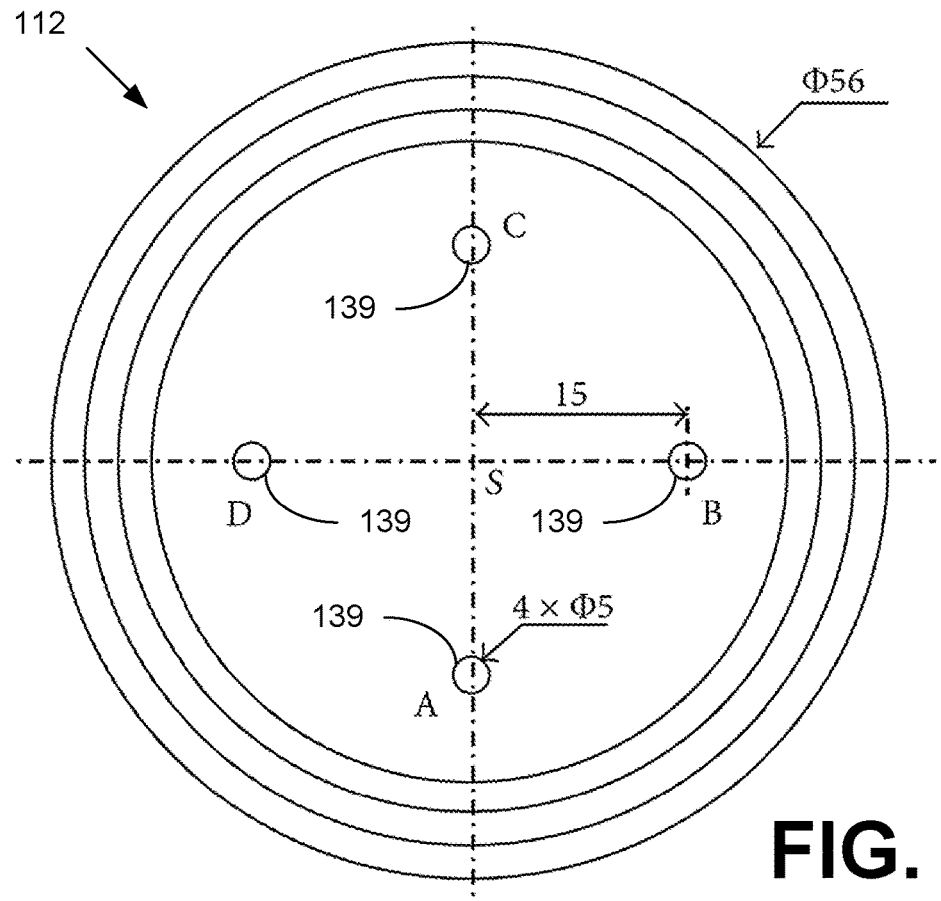

FIG. 2B shows a mechanical schematic of an example of the secondary coil 112, including four auxiliary (or minor) coils 139. The four small coils 139 are mounted symmetrically. The minor coils 139 can be used to detect the lateral or offset distance (L) from the center of the primary coil 109 to the center of the secondary coil 112 when the two coils begin to overlap. Since the actual magnetic field strength and distribution are always different from the computational value, the minor coils' output distance can be outputted by matching the immediate value with an experimentally acquired data space. This scenario can be used when the primary and secondary coils 109 and 112 are close enough with each other that the coil's detection limit might not be effective. The use of four coils 139 allows the alignment system 136 to determine whether the driver needs to move left, right, forward, or backward. Zero misalignment occurs when the relative output value of the four nodes or coils 139 is zero. For example, an allowable tolerance can be defined and used to determine when the coils 109 and 112 are substantially aligned. Other combinations of coils 139 can be used, with the coil output combined based upon their relative positions to provide a misalignment indication.

Figure 2C:
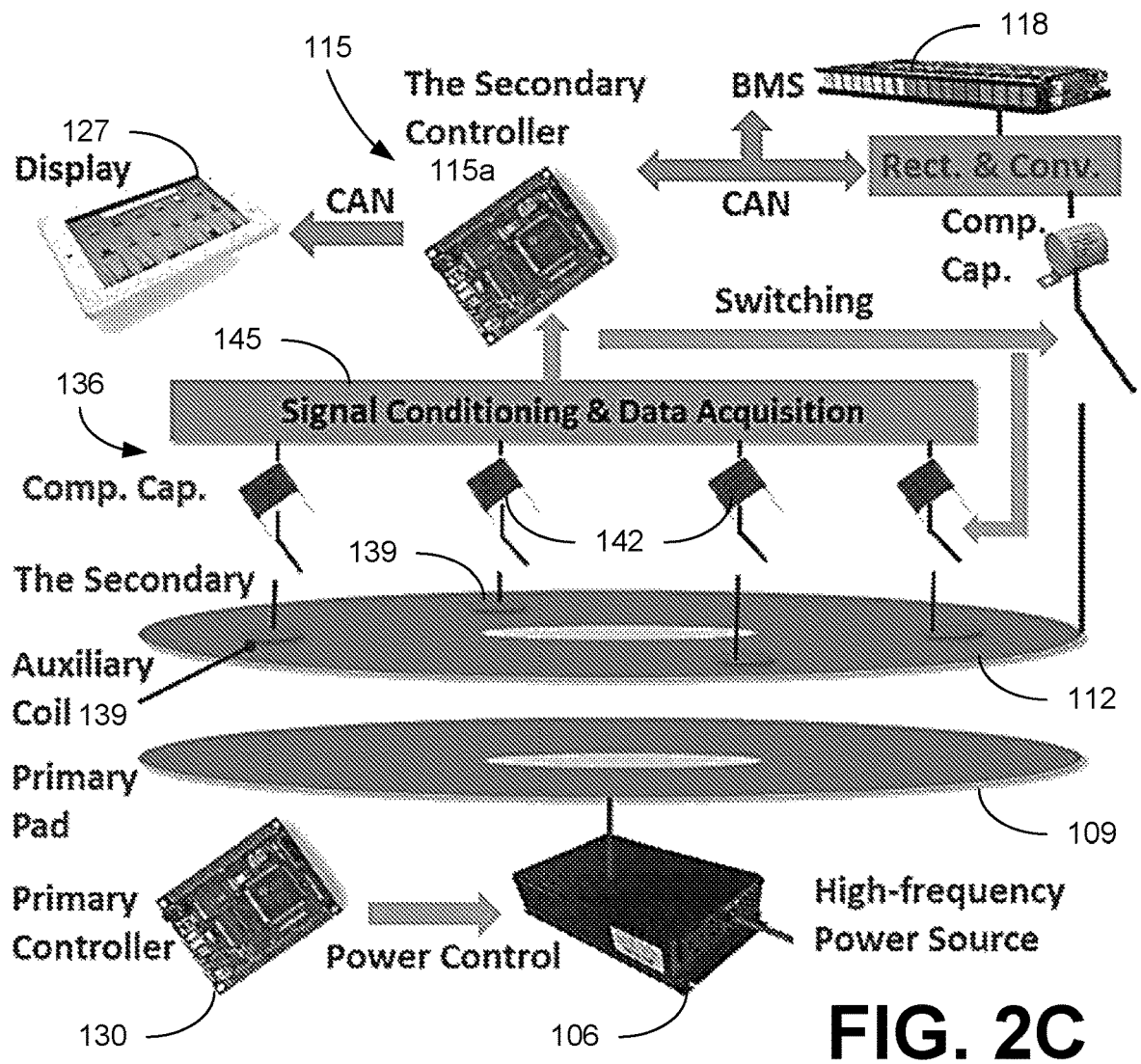
Figure 2D:
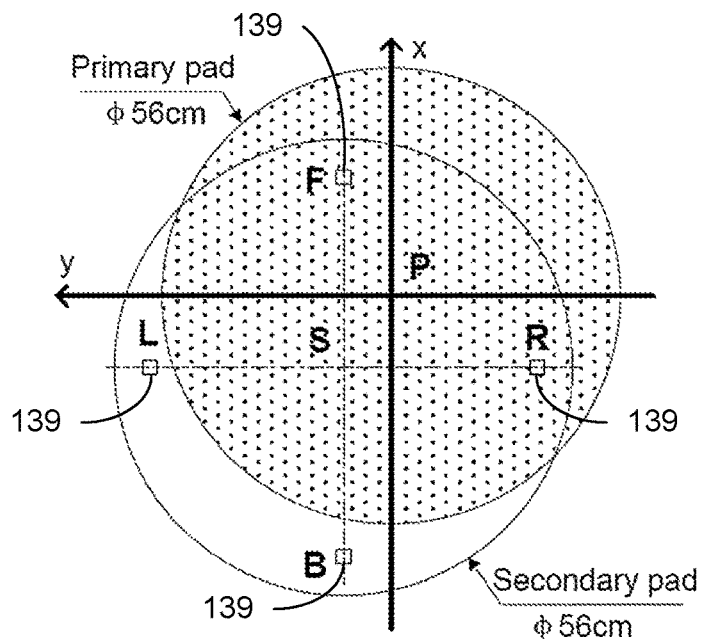

FIG. 2C illustrates additional features of the alignment system 136 configured for three-dimensional (3D) coil positioning. As shown in FIG. 2C, the coil positioning utilizes the wireless charging hardware, including the high frequency power source 106, processor, and the existing primary coil 109. The secondary side includes the secondary controller 115a, compensation capacitors 142, and multiple auxiliary coils 139. Since the secondary coil position (x, y, z) has three unknowns in a 3D coordinate system, at least three auxiliary coils 139 are used to identify the position. Assuming the primary and the auxiliary coil planes are parallel with each other in EV charging, the tilt and azimuthal orientation of the target can be neglected. As shown in the vertical view of FIG. 2D, four auxiliary coils 139 can be employed for identifying three variables with the auxiliary coils 139 fixed on forward (F), backward (B), left (L) and right (R) directions of the secondary pad 112. Although the position coordinates of the secondary coil 112 can be obtained from three auxiliary coil inputs, the configuration of four (or more) auxiliary coils 139 allows for a more accurate positioning by calculating the average value of four sets of position data. The use of the four auxiliary coils 139 can increase the detection range around the primary coil 109 for parking.

In practical applications, the vehicle position (between the primary and secondary coils 109 and 112) can be deduced by acquiring and analyzing the outputs of the four auxiliary coils 139. The primary coil 109 can be configured to generate a weak magnetic field out of consideration for the safety of both living things and the charging hardware, which might be destroyed under large misalignment conditions if operated in high power. For the auxiliary coil design, the alignment system 136 can include compensation capacitors 142 that are provided in parallel with the wire loops of the auxiliary coils 139 to create resonance and significantly increase the output signal. The voltage at the auxiliary coil 139, which is consistent with the received power, is dependent on the coupling coefficient between the coupled coils 109 and 139. The coefficient is directly proportional to the mutual inductance between the coupled coils 109 and 139. For measurement purposes, output voltages of the auxiliary coils 139 can be chosen as representative of the positioning sensing and can be used to represent the sensor signals and seen as a medium for signal transmission and processing. The alignment system 136 can include signal conditioning and/or data acquisition circuitry 145 to facilitate measurement of the auxiliary coil outputs.

The auxiliary coil 139 can be fabricated on a PCB board by winding the coil in a flat spiral loop. The PCT board can also include the compensation capacitor 142, switching, signal conditioning and/or data acquisition circuitry 145. The switches can be used to enable or disable the compensation capacitors 142 and/or the EV load (e.g., the battery 115) to avoid the mutual interference from the other coils during the positioning. For example, a switch on an active auxiliary coil 139 can be turned on to read data while all other switches are off to keep other auxiliary coil sensors inactive. A switch on the output of the secondary coil 112 can be disabled before beginning the alignment process and turned on when starting charging. A compensation capacitor can also be provided at the output of the secondary coil 112. The secondary controller 115a can be used to control the auxiliary coil output measurement and transition to another auxiliary coil 139 when the previous voltage output is stored in its memory (e.g., RAM). The secondary controller 115a can also comprise processing circuitry that can determine the current alignment between the primary and secondary coils 109 and 112 based on the measured outputs. The current position can be updated on the display 127 whenever the secondary controller 1115a has a new data set of the four coil outputs.

Placement of Auxiliary Coil Nodes on the Secondary Coil Pad. The position of the secondary coil 112 with respect to the primary coil 109 can be calculated with the auxiliary coils 139 placed on the secondary coil 112. However, the field distribution needs to be considered for the auxiliary placement because the detection resolution can vary for different coil placement. The location of the auxiliary coils 139 attached on the secondary coil 112 should ensure that the auxiliary coils 139 have a maximum field measurement resolution when the primary and secondary coils 109 and 112 are coaxially aligned, which allows for the highest positioning accuracy.

Figures 3A, 3B:
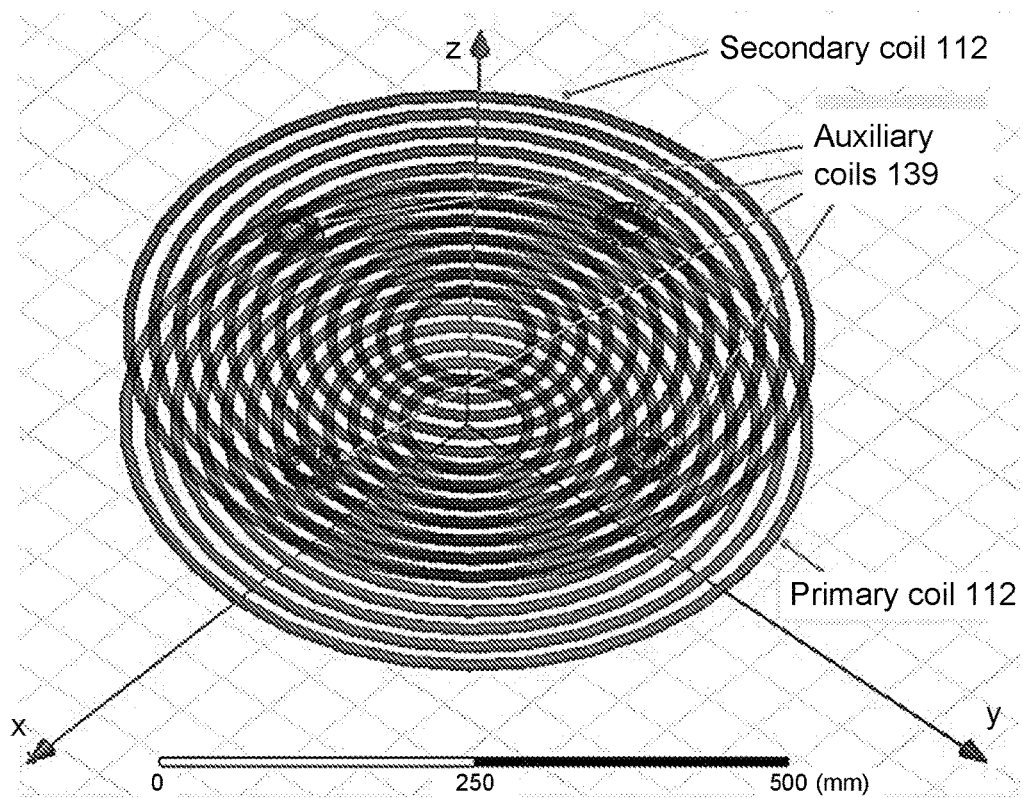
FIGS. 3A through 3E illustrate characteristics and placement of the auxiliary coils of FIGS. 2B-2D, in accordance with various embodiments of the present disclosure.
Figure 3C:
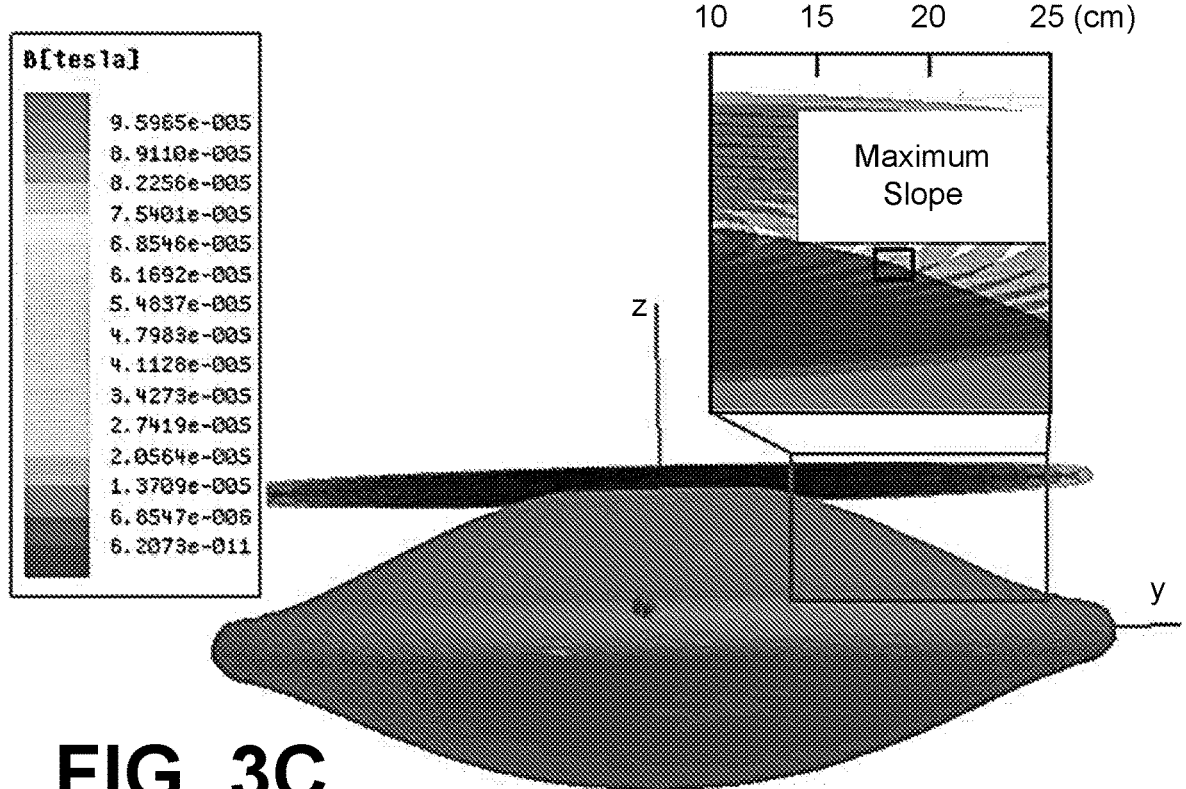

FIG. 3A shows a 3D model illustrating the spatial distribution of the coil spatial structure of the wireless charging system 100 (FIG. 1). The field distribution of the primary coil 109 can be modeled and simulated using a finite element method (FEM) to determine the maximum rate of field change (or maximum slope) for the auxiliary coil placement. The table in FIG. 3B displays the primary, secondary and auxiliary coil parameters and specifications used in the simulation. The simulations showed that the mutual inductance between the auxiliary coils 139 and the primary coil 109 was approximately 0.08 pH, meaning that it can be disregarded for simplification and its effects on power transfer would be neglected. The circulating current was set at 0.3 A in the primary coil 109 and the air gap was set at 10 cm in the simulation. FIG. 3C illustrates the magnetic flux distribution produced by excitation of the primary coil 109. For the specified parameters, the field slope was found to be maximized when the distance from the primary center (P) is 18-19 cm, which corresponds to the best auxiliary coil location on the secondary coil 112. The area where the field has the maximum slope as illustrated in FIG. 3C provides the location where the auxiliary coils 139 can detect the field at the highest resolution through the mutual coupling with the primary coil 109. The highest detection resolution at this area can decrease the positioning error for perfect alignment.

Figure 3D:
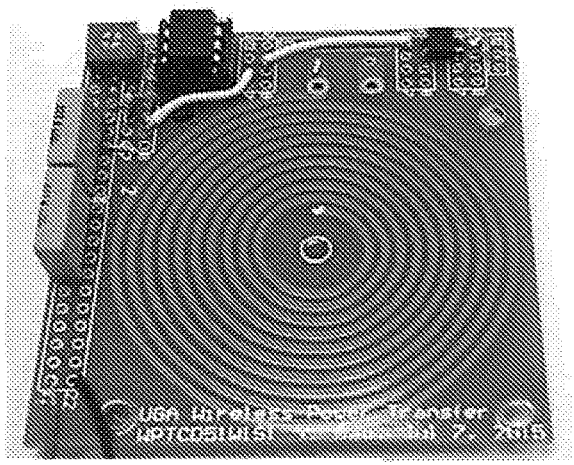
Figure 3E:
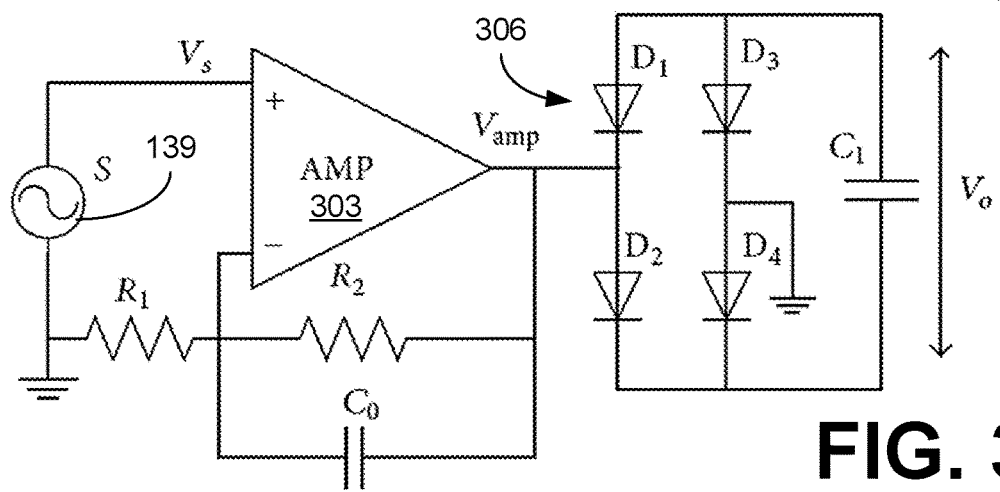

FIG. 3D is an image of an example of an auxiliary coil 139 that was fabricated on a printed circuit board (PCB). The specifications of the auxiliary coil 139 is listed in the table of FIG. 3B. FIG. 3E shows the circuit diagram illustrating the auxiliary coil circuit on the PCB. It includes an inverting amplifier 303, a rectifier 306 including four Schottky diodes, and a film capacitor $C_1$ for filtering the output voltage variations. Since the operating frequency of the wireless charging system can range from 15 kHz to 25 kHz, the electric components should be capable of operating within the frequency band. In FIG. 5, the capacitor $C_0$ together with the feedback resistor $R_2$ adds a null end to the Bode plot of the circuit, lowering the bandwidth of the amplifier 303 and filtering high frequency noises. The rectifier 306 and the filtering capacitor $C_1$ convert the alternating current (AC) signals of the amplifier to direct current (DC) signals which can then be acquired using, e.g., an NI DAQ module or card. Because the data card faces difficulty in acquiring the high frequency signal, the signal is first converted to DC for sampling and processing by the DAQ using, e.g., LabVIEW or other analysis software.

Figure 4A:
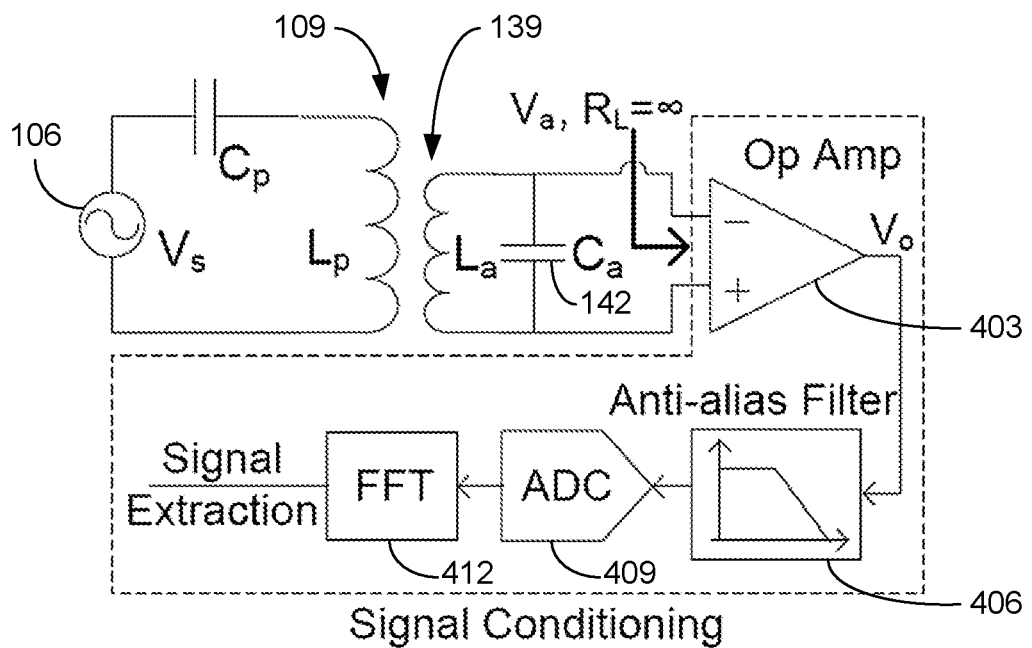
FIG. 4A is a schematic diagram illustrating an example of signal conditioning and data acquisition circuitry of FIG. 2C, in accordance with various embodiments of the present disclosure.

Configuration of Signal Conditioning Circuitry. Referring now to FIG. 4A, shown is a sensing circuit diagram illustrating a configuration for signal sensing and conditioning the output of the auxiliary coils 139. As shown in the example of FIG. 4A, a power source ($V_s$) 106 drives the primary coil ($L_p$) 109. The signal conditioning 145 of the alignment system 136 can include an operational amplifier (op amp) 403 coupled to the output of the auxiliary coil 139 across the compensation capacitor ($C_a$) 142, and a filter 406 such as, e.g., an anti-aliasing filter. The load $R_L$ is the input impedance of the op amp 403, which is infinite. The operating angular frequency ω of the power source (or inverter) 106 can be calculated by keeping the two coupled coils 109 and 130 resonating simultaneously. This relationship can be expressed as:

$$\omega = \frac{1}{\sqrt{L_p C_p}} = \frac{1}{\sqrt{L_a C_a}}, \quad (1)$$

where $C_p$ is the compensating capacitance at the primary side and $C_a$ is the compensating capacitance 142 at the auxiliary sides; $L_p$ and $L_a$ are the self-inductance of the primary and auxiliary coils 109 and 139, respectively.

The power source (or inverter) 106 can be programmed or controlled to input a low current to the primary coil 109 to generate a weak magnetic field for the auxiliary sensor coils 139 to pick up the signal. A non-inverting op-amp 403 can be used to increase the amplitude of the output signal, then the signal conditioning 145 or secondary controller 115a can convert the amplifier's analog output into digital signals using an analog-to-digital converter (ADC) 409 for a fast Fourier transform (FFT) 412, to extract the signal amplitude in the frequency domain.

Figure 4B:
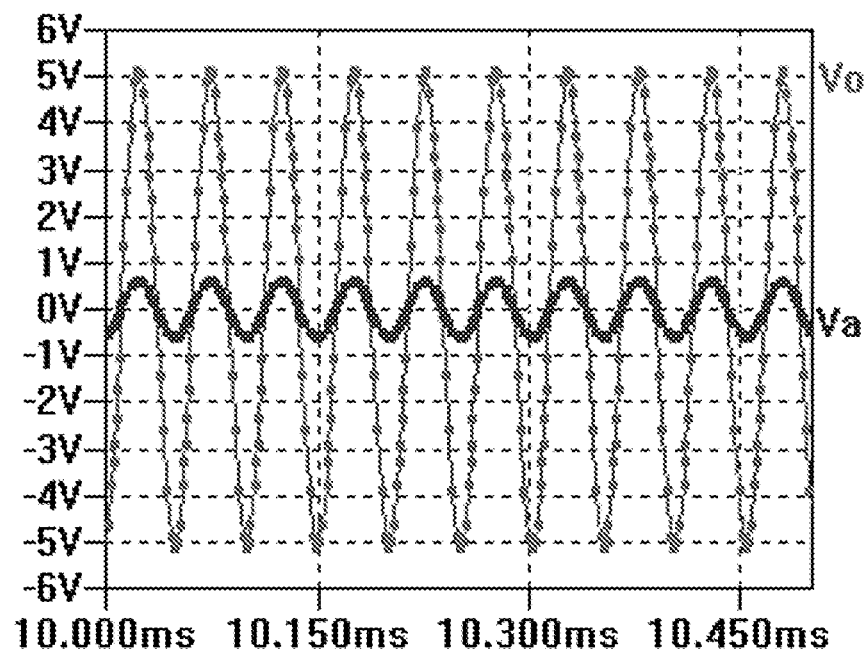
FIG. 4B is a plot illustrating an example of the signal conditioning and data acquisition circuitry output, in accordance with various embodiments of the present disclosure.

FIG. 4B shows simulation results (using LTspice) for the sensor signal before and after the amplification. Simulation conditions were $V_s$=5.6V, supply frequency of 19.8 kHz and a mutual inductance of 0.1 µH (with a coil gap of 10 cm), and an amplification factor of 8.4. Since the auxiliary coils 139 are ten times smaller in diameter than the primary coil 109 and the mutual inductance is quite small when the two coils are relatively far away from each other, the output voltage of the auxiliary coils 139 can be quite weak, thus, an amplifier 403 is applied to increase the output level and detection range.

Analysis of Equivalent Circuit and Positioning. The position of the secondary coil 112 can be estimated by measuring the auxiliary coil's voltage output. The auxiliary voltage output is determined by the mutual inductance or coupling coefficient between the primary and auxiliary coils 109 and 139. Here the mutual inductance is directly proportional to the coupling coefficient, which can be expressed as:

$$k = \frac{L_m}{\sqrt{L_p L_a}}. \tag{2}$$

where $L_m$ is the mutual inductance between the two coupled coils. The Neumann formula defines the mutual inductance between two coupled coils by their relative position, which in this case is variable, and a physical dimension, which in this case is fixed. Moreover, the center coordinate of the secondary coil 112 can be transformed to the auxiliary coordinates which correspond to the measured voltages. Thus, this process can include modeling the output voltage, converting voltage to mutual inductance, deriving the mutual inductance from position, coordinate vector transformation from the secondary to the auxiliaries, and calibration and positioning estimation.

Figure 5A:
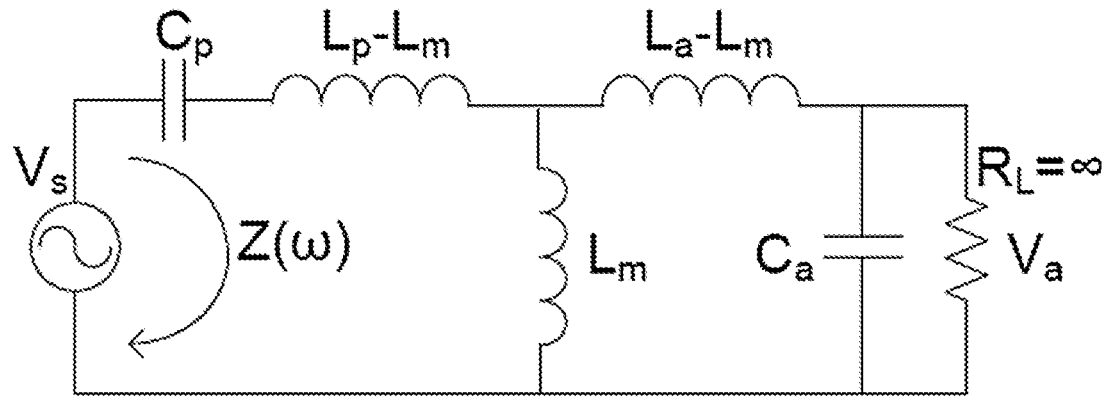
FIG. 5A is an equivalent circuit diagram modeling the coupling between the primary coil and an auxiliary coil, in accordance with various embodiments of the present disclosure.

The use of tuning capacitors and switches across the auxiliary coils 139 allows the primary coil 109 to resonate with only one auxiliary coil 139 at a time. Since the signal conditioning 145 is isolated from the resonance and is a linear amplification on the resonance output, the equivalent circuit can be modeled as depicted in FIG. 5A, where $L_m$ is the mutual inductance between the primary coil 109 and the auxiliary coil 139 and $L_p$ and $L_a$ are the self-inductance of the primary and auxiliary coils 109 and 139, respectively. The input impedance of the equivalent circuit of FIG. 5A is given by:

$$Z(\omega)=(j\omega C_p)^{-1}+j\omega L_p+j\omega L_m//[j\omega L_a+(j\omega C_n)^{-1}], \tag{3}$$

and the voltage gain is $$G = \left|\frac{V_a}{V_s}\right| = \left|\frac{(j\omega C_a)^{-1}}{Z(\omega)}\right|. \tag{4}$$

Substituting equations (2) and (3) into equation (4) gives:

$$G = \left|\frac{\omega^2 C_p L_m}{\omega^4 L_p L_a C_p C_a (1-k^2) - \omega^2 (L_p C_p + L_a C_a) + 1}\right|. \tag{5}$$

As discussed above, $V_a$ is linearly amplified by the conditioning circuitry, thus the output signal throughout the whole sensing circuit ($V_o$) is:

$$|V_o| = \left|\frac{K_{amp} V_s \omega^2 C_p L_m}{\omega^4 L_p L_a C_p C_a (1-k^2) - \omega^2 (L_p C_p + L_a C_a) + 1}\right|, \tag{6}$$

in which $K_{amp}$ is the amplification factor of the signal conditioning circuitry 145. The output $V_a$ can be measured by the secondary controller 115a and extracted in terms of amplitude and frequency.

Figure 5B:
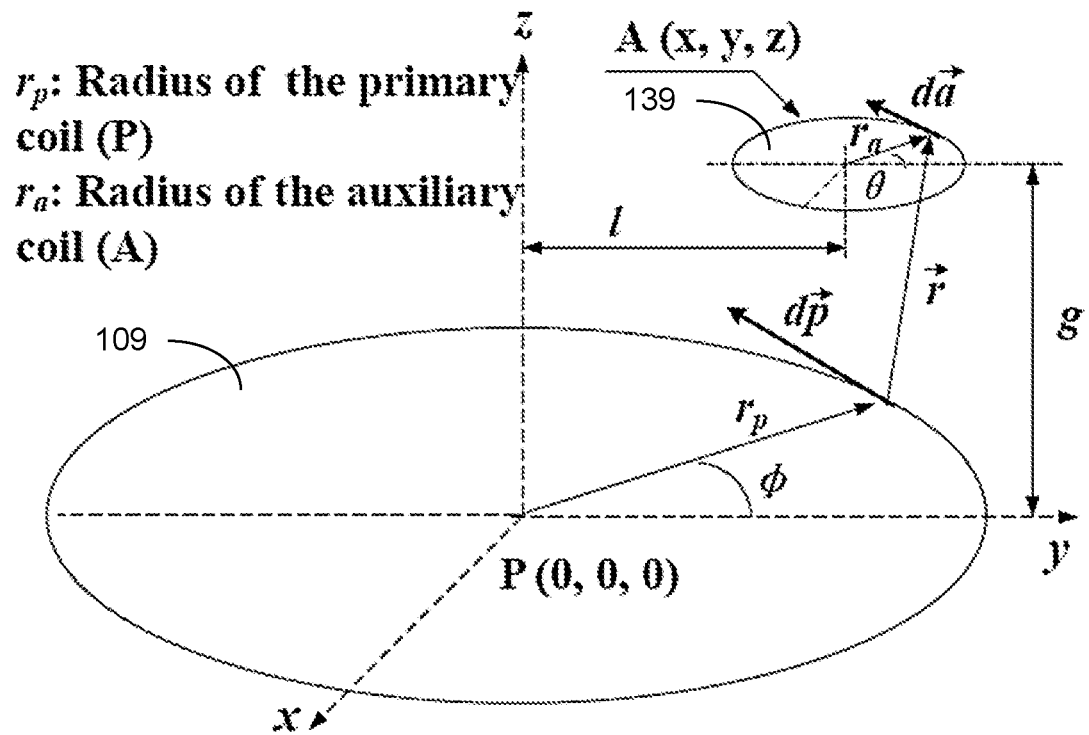
FIG. 5B illustrates an example of the spatial configuration between the primary coil and an auxiliary coil, in accordance with various embodiments of the present disclosure.

FIG. 5B shows the spatial configuration of each set of wire loops in a 3D coordinate system for mutual inductance calculation. Neumann formula is used to express the mutual inductance between two wire loops:

$$M = \frac{\mu_0}{4\pi} \oint_p \oint_a \frac{d\vec{p} \cdot d\vec{a}}{r}, \tag{7}$$

where $\mu_0$ is the space permeability, $d\vec{p}$ and $d\vec{a}$ are the small line parameter for integration, and r is the distance between $d\vec{p}$ and $d\vec{a}$. In FIG. 5B, φ is the corresponding angle of integration variable of the primary coil 109 while θ is the angle of the auxiliary coil 139, the coordinate of primary coil center is (0, 0, 0), and the auxiliary sensor coil center is (x, y, z). Thus $$r = \sqrt{r_p^2 + r_a^2 + g^2 + l^2 - 2r_p r_a \cos(\phi - \theta) - 2r_p l \cos\phi + 2r_a l \cos\theta}, \tag{8}$$

$$d\vec{p} \cdot d\vec{a} = r_p r_a \cos(\phi - \theta) d\phi d\theta, \text{ and} \tag{9}$$

$$l = \sqrt{x^2 + y^2}, \text{ and } g = z. \tag{10}$$

Combining equations (7), (8) and (9) into equation (10) gives the mutual inductance as:

$$M = \frac{\mu_0}{4\pi} \int_0^{2\pi} \int_0^{2\pi} \frac{r_p r_a \cos(\phi - \theta) d\phi d\theta}{\sqrt{\begin{array}{c} r_p^2 + r_a^2 + x^2 + y^2 + z^2 - \\ 2r_p r_a \cos(\phi - \theta) - \\ 2\sqrt{x^2+y^2}(r_p \cos\phi - r_a \cos\theta) \end{array}}}. \tag{11}$$

Equation (11) shows the mutual inductance (M) between two wire loops. As both of the two coupled planar coils have multiple turns of wire loops, the mutual inductance between them is the sum of all possible combinations of single wire loops. Hence, the total mutual inductance is given by:

$$L_m = \sum_{i=1}^{n_p} \sum_{j=1}^{n_a} M_{ij}. \quad (12)$$

where $M_{ij}$ is the mutual inductance between wire loop i of the primary coil 109 and j of the auxiliary coil 139. Equations (11) and (12) indicate that the mutual inductance $L_m$ is a function of the auxiliary coil position $A_n(x_n, y_n, z_n)$ in which n is the number of sensor nodes, thus, the relation can be described as $L_m = h(x_n, y_n, z_n)$. Given that all the electrical characteristics in equation (6) are fixed in the sensing circuit except for the mutual inductance depending on the relative position between the coupled coils, $V_o$ is a function of position, assumed as $$V_0 = f(L_m) = f[h(x_n, y_n, z_n)]. \quad (13)$$

In the example of FIGS. 2B-2D and 3A, four sensor nodes are utilized so n=4. Assuming the secondary coordinates are $S(x_s, y_s, z_s)$, then $$\vec{A} = \vec{D} \cdot \vec{S}, \quad (14)$$

where A is the sensor node matrix, and D is the transform matrix between A and S, such that:

$$\begin{bmatrix} x_1 & y_1 & z_1 \\ x_2 & y_2 & z_2 \\ x_3 & y_3 & z_3 \\ x_4 & y_4 & z_4 \end{bmatrix} = \begin{bmatrix} d & d & 0 \\ -d & -d & 0 \\ d & -d & 0 \\ -d & d & 0 \end{bmatrix} \cdot \begin{bmatrix} x_s \\ y_s \\ z_s \end{bmatrix}, \quad (15)$$

in which d is the distance from the center of the secondary pad (or coil) 112 to the auxiliary nodes (or coils) 139.

According to equations (14) and (15), although the output voltage corresponds to the secondary position, which can form 4 equations for three unknowns, the position coordinates $(x_s, y_s, z_s)$ cannot be mathematically expressed due to the calculation of dual integrals. However, a database matching technique can be established to derive the coordinate of the secondary coil 112 and solve this issue.

As discussed with respect to equations (13)-(15), there is a one to one correspondence between the voltage vector $\vec{V}(V_1, V_2, V_3, V_4)$, which is acquired by the secondary controller 115a, and the secondary coil coordinates $(x_s, y_s, z_s)$, in the 3D space. Hence, the three variables can be derived by matching the measured voltages $\vec{V_m}$ with the built-in voltage array $\vec{V}$ until $\|\vec{V} - \vec{V_m}\|$ is minimized (or is reduced within a defined threshold). The matching process can be realized iteratively with a for-loop (e.g., an exhaustive search) to determine the desired position one by one throughout the lookup table.

Although the database can be numerically obtained through equations (13)-(15), experimentally measuring the voltage outputs at positions within an alignment region can increase accuracy by avoiding the possible negative influence of metal objects such as vehicle chassis. A large metal chassis can re-shape the field distribution dynamically while aligning the coils. Another advantage is that the systematic error resulting from sensor placements and sensing circuits can be diminished because it bypasses the process or electrical elements.

Figure 6:
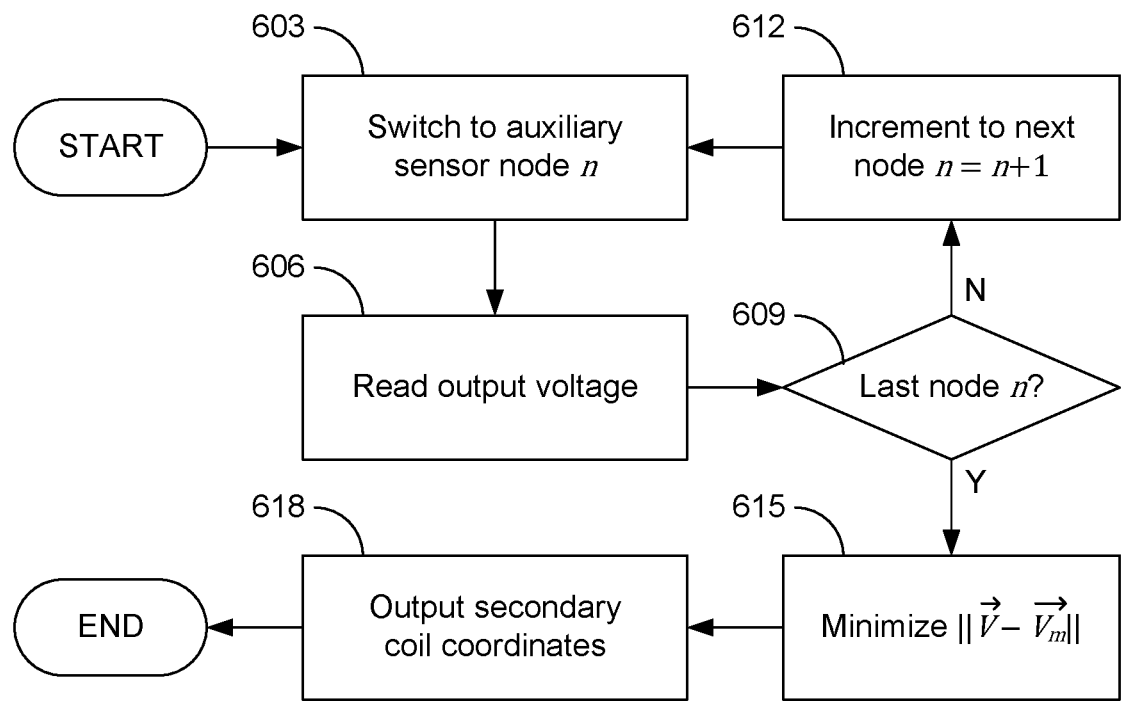
FIG. 6 is a flowchart illustrating an example of a positioning methodology utilizing the auxiliary coil outputs, in accordance with various embodiments of the present disclosure.

FIG. 6 shows a flowchart illustrating an example of the positioning methodology. Beginning at 603, the alignment system 136 witches to an auxiliary sensor node 139 and the output voltage of the auxiliary coil 139 is read or measured at 606 by the secondary controller 115a. The reading can be stored in memory. At 609, it is determined if readings have been obtained from all of the auxiliary sensor nodes. If the output voltage has not been measured for all of the auxiliary coils 139, and the last node has not been reached at 609, then the process increments to the next auxiliary sensor node (n=n+1) at 612, and the flow returns to 603 were the alignment system 136 switches to the next auxiliary sensor node 139. If the last auxiliary sensor node 139 has been reached, then the flow proceeds to 615 where the secondary coil coordinates are determined by minimizing the magnitude of the difference between the built-in voltage array $\vec{V}$ and the measured voltages $\vec{V_m}$. For example, the difference may be reduced until the magnitude falls below or reaches a defined threshold value. As discussed, the position can be determined one by one throughout the lookup table using a for-loop or other iterative method. The secondary coil coordinates can then be output (e.g., via display 127) at 618.

Figure 7:
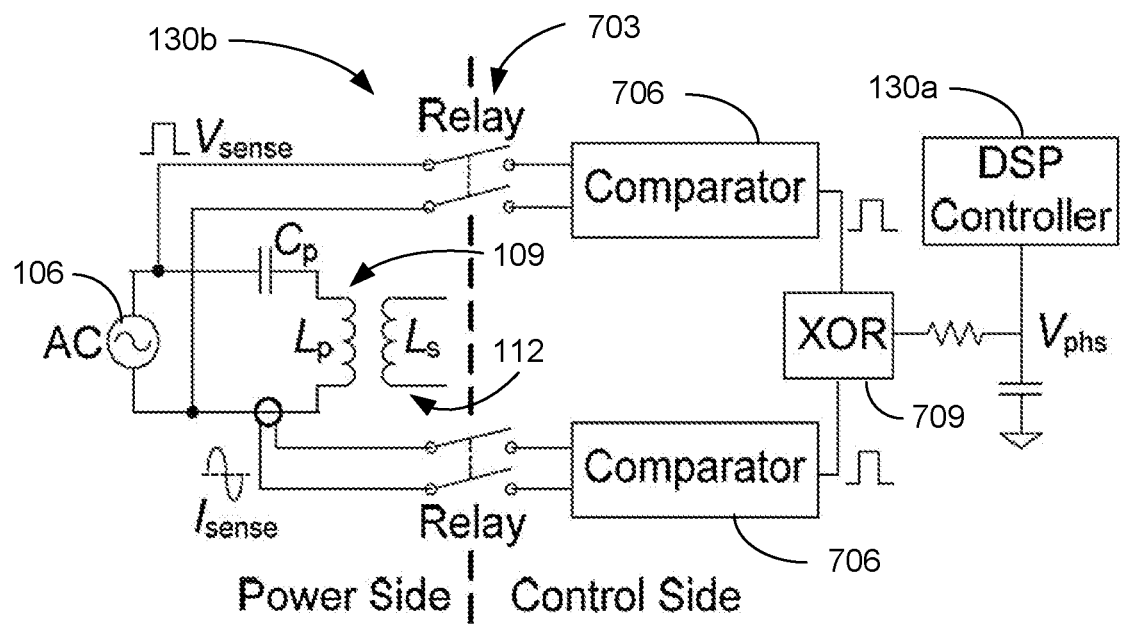
FIG. 7 is a schematic diagram illustrating an example of the phase-angle measurement of FIG. 2A, in accordance with various embodiments of the present disclosure.

After completion of an alignment operation, the primary controller 130 (FIG. 1) can tune for an optimal switching frequency based on the phase-angle feedback as well as the battery's state of charge, and then start charging. FIG. 7 is a block diagram illustrating an example of the phase-angle measurement module 130b (FIG. 2A) of the primary controller 130. Relays 703 or other appropriate switches can be used to isolate the power side electronics from the control side electronics due to the high power levels present during wireless charging. Comparators (or shaping circuits) 706 can be used to transform the output voltage ($V_s$) and current ($I_s$) signals from the inverter (or power supply) 106 into two square waveforms. The phase delay between $V_s$ and $I_s$ can be measured using an exclusive-OR gate (XOR) 709 that combines the two square waveforms into a single pulse waveform. A low-pass filter can convert the XOR output pulse into a DC signal $V_{phs}$, which can also be amplified. The primary controller 130 can measure the voltage signal using an ADC of, e.g., the DSP controller 130a and obtain the phase-angle information based upon the DC signal. The DC output of the filter is proportional to the phase-angle between the sensed voltage and current $V_s$ and $I_s$. The DC input voltage is operated at a relatively low voltage (limited to, e.g., 24V) during the vehicle alignment and frequency tunig process, as lower voltage levels are much safer for the control electronics.

In the phase-angle measurement circuit 130b, a voltage probe can be directly connected to the output of the power supply (or inverter) 106 through a resistance divider. This is because the switching frequency is more than 10 kHz, and thus such high frequency makes a typical commercialized hall-effect voltage sensor unable to catch the fast response time. The AC current of the power supply (inverter) 106 can be measured using a current transformer. Although discrete Fourier transform (DFT) can be implemented by the DSP controller 130a for phase-angle measurements, using an XOR and RC filter greatly simplifies the embedded software development process and reduces the computational load of the DSP controller 130a.

Figure 8A:
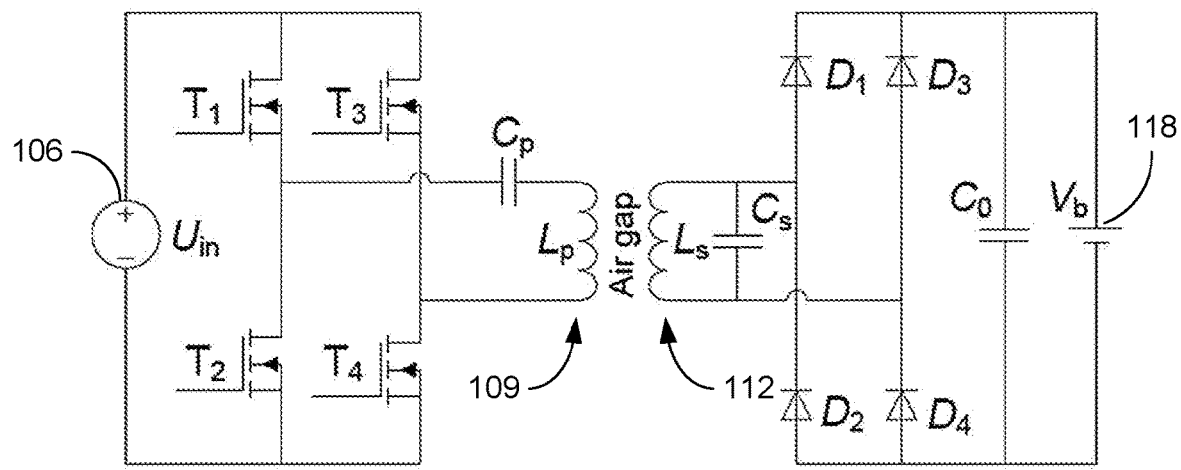
FIGS. 8A and 8B are a schematic diagram illustrating an example of a wireless power transfer (WPT) topology and an equivalent circuit diagram modeling the coupling between the primary and secondary coils, in accordance with various embodiments of the present disclosure.

FIG. 8A shows an example of a series parallel topology for wireless power transmission (WPT). The primary and secondary coils 109 and 112 both have 12 turns, with a primary coil inductance $L_p$ of 65.3 µH and a secondary coil inductance $L_s$ of 65.1 µH as indicated in the table of FIG. 3B. The tuning capacitance for both sides ($C_p$ and $C_s$) is 1 µF. According to the equivalent circuit shown in FIG. 8B, the circuit impedance $Z(\omega)$ is $$Z(\omega) = \frac{1}{j\omega C_p} + j\omega(L_p - L_m) + j\omega L_m // \left( j\omega(L_s - L_m) + \frac{1}{j\omega C_s} // R_L \right), \quad (16)$$

where j is the imaginary unit, ω is the angular frequency, $L_m$ is the mutual inductance between the primary and secondary coils 109 and 112, and $R_L$ is the equivalent resistance of the battery 118 (FIG. 1), which can be calculated using the delivered power and voltage across the battery 118. For a desired 1.4 kW/120V battery charging condition, $R_L$ is 20Ω.

The coupling coefficient can be expressed as:

$$k = \frac{L_m}{\sqrt{L_p L_s}}. \quad (17)$$

Figure 8B:
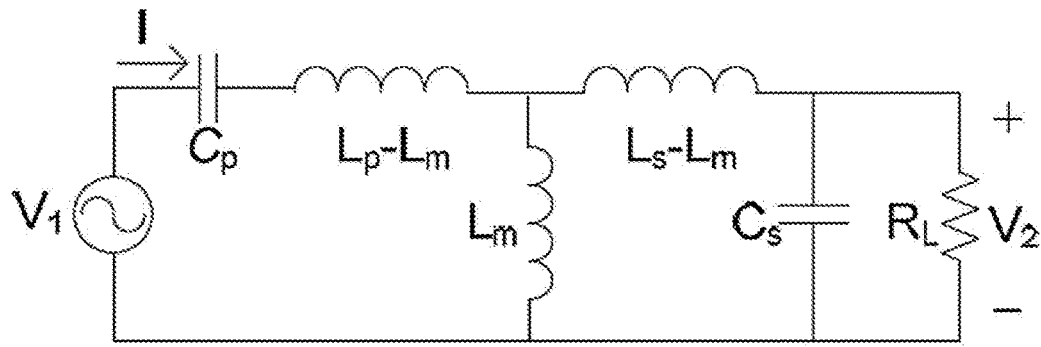

The voltage gain G is the ratio of output voltage $V_2$ over input voltage $V_1$ as shown in FIG. 8B, and can be determined by:

$$G = \left| \frac{\omega^2 L_m C_p R_L}{\omega^4 L_p L_s C_p C_s R_L (1-k)^2 - \omega^2 R_L (L_p C_p + L_s C_s) + R_L - j(\omega^3 L_p L_s C_p (1-k^2) - \omega L_s)} \right|. \quad (18)$$

The mutual inductance changes with different coil alignments, which can cause a shift in the best switching frequency for the WPT. According to the Neumann formula, the mutual inductance is a function of the coil dimension and spatial arrangement. Since the coil dimensions have been determined, the coupling coefficient becomes a function of misalignment and air gaps. Therefore, the coil misalignment can be measured through analyzing the frequency characteristics of the WPT.

Figure 9A:
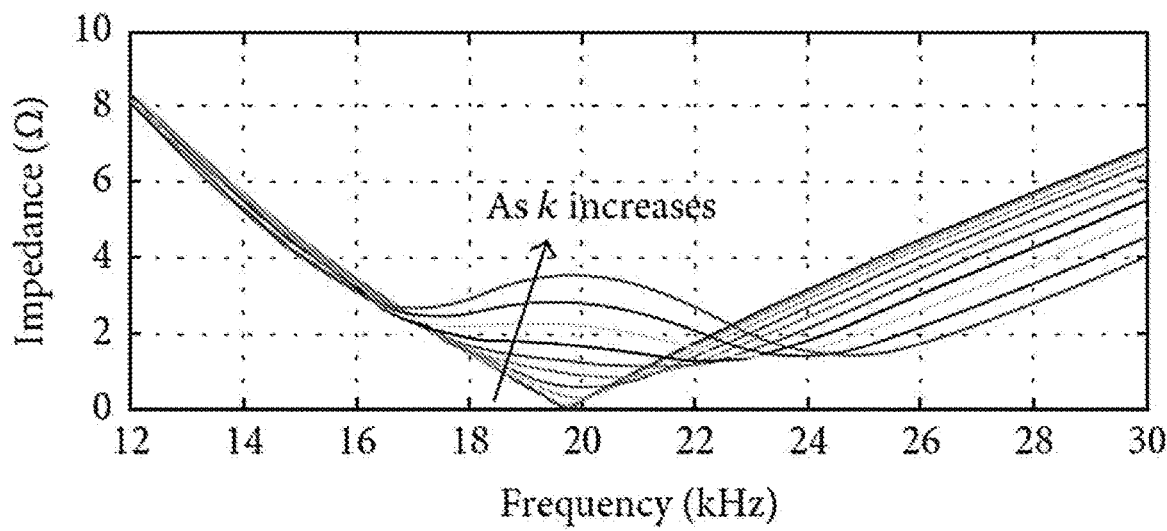
FIGS. 9A through 9C are plots illustrating simulated impedance magnitude, phase-angle and voltage gain characteristics, respectively, of the WPT topology of FIG. 8A, in accordance with various embodiments of the present disclosure.
Figure 9B:
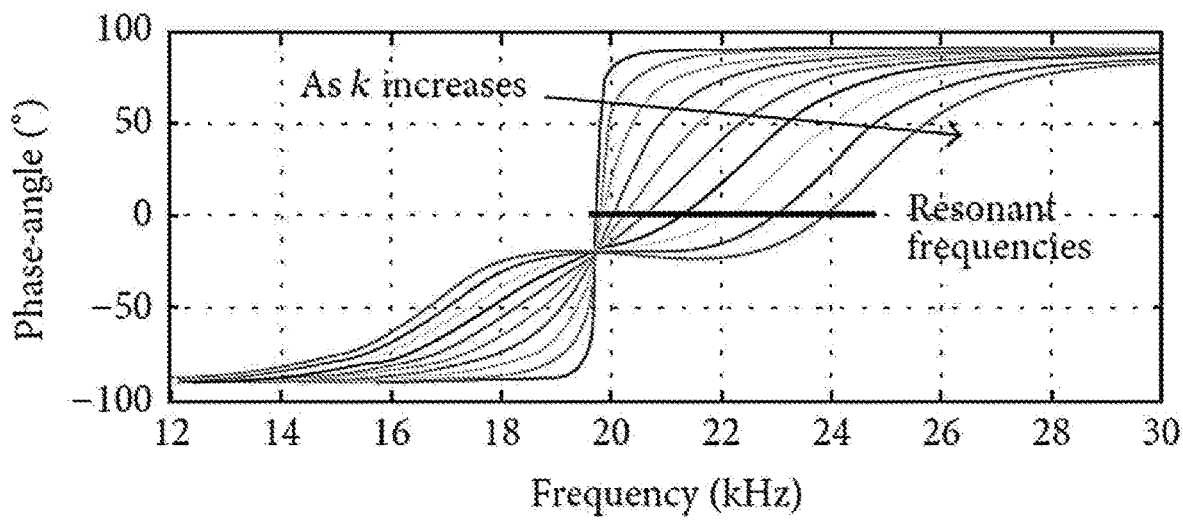
Figure 9C:
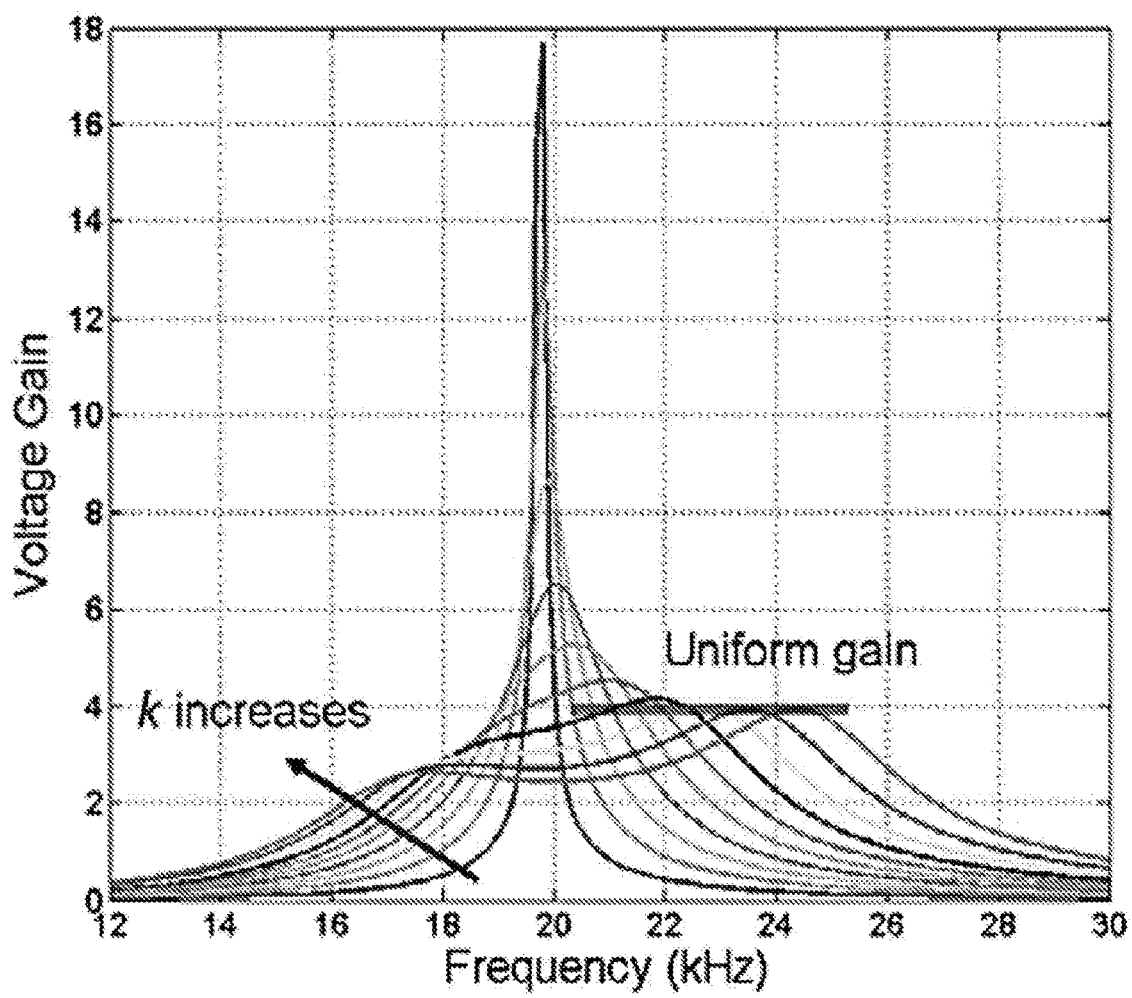

Referring to FIGS. 9A, 9B and 9C, shown are simulated impedance magnitude, phase-angle and voltage gain characteristics, respectively, in the frequency domain with multiple coupling coefficient values. The parameters of the wireless charging system were $L_p$=65 μH, $L_s$=65 μH, $C_p$ and $C_s$=1 μF and $R_L$=20Ω. The mutual inductance $L_m$ was assumed to be 2.5, 5, 7.5, 10, 12.5, 115, 17.5, 20, 22.5 and 25 μH in the simulation. The total impedance on the right side of FIG. 9A (e.g., >20 kHz) is inductive in this frequency domain where the input voltage leads the input current, which also realizes a zero voltage switching (ZVS) operation of the inverter 106. For each curve of the phase-angle in FIG. 9B, one zero-crossing point exists, which indicates the resonant frequency. The resonant frequency varies with different coupling coefficients. Thus, the lateral distance (L) between the primary and secondary coils 109 and 112 can be obtained through adjusting the frequency until the phase-angle becomes zero. The resonant frequency indicates the lateral distance. As shown in FIG. 9C, while the voltage gain varies at a specific frequency according to different magnetic couplings, uniform voltage gain can be achieved for a given coupling by changing the switching frequency. The frequency range in FIG. 9C for uniform gain control is from 20.2 kHz to 24.4 kHz.

A uniform gain control method can be used to generate a fixed output voltage regardless of any coil misalignment. The WPT can be configured to automatically choose the optimal frequency after the EV is parked but before charging begins. The resonant frequency is the frequency that makes the load phase-angle between the primary inverter's input voltage and current zero. While the resonant frequency allows the system to transfer maximum power, the output voltage at the secondary side varies significantly, thus increasing the difficulty in designing a DC-DC converter that can ensure the charger voltage is stable. The non-zero phase-angle between the primary inverter's output voltage and current allows for the use of soft switching, decreasing the power losses caused by switching devices.

Figure 10:
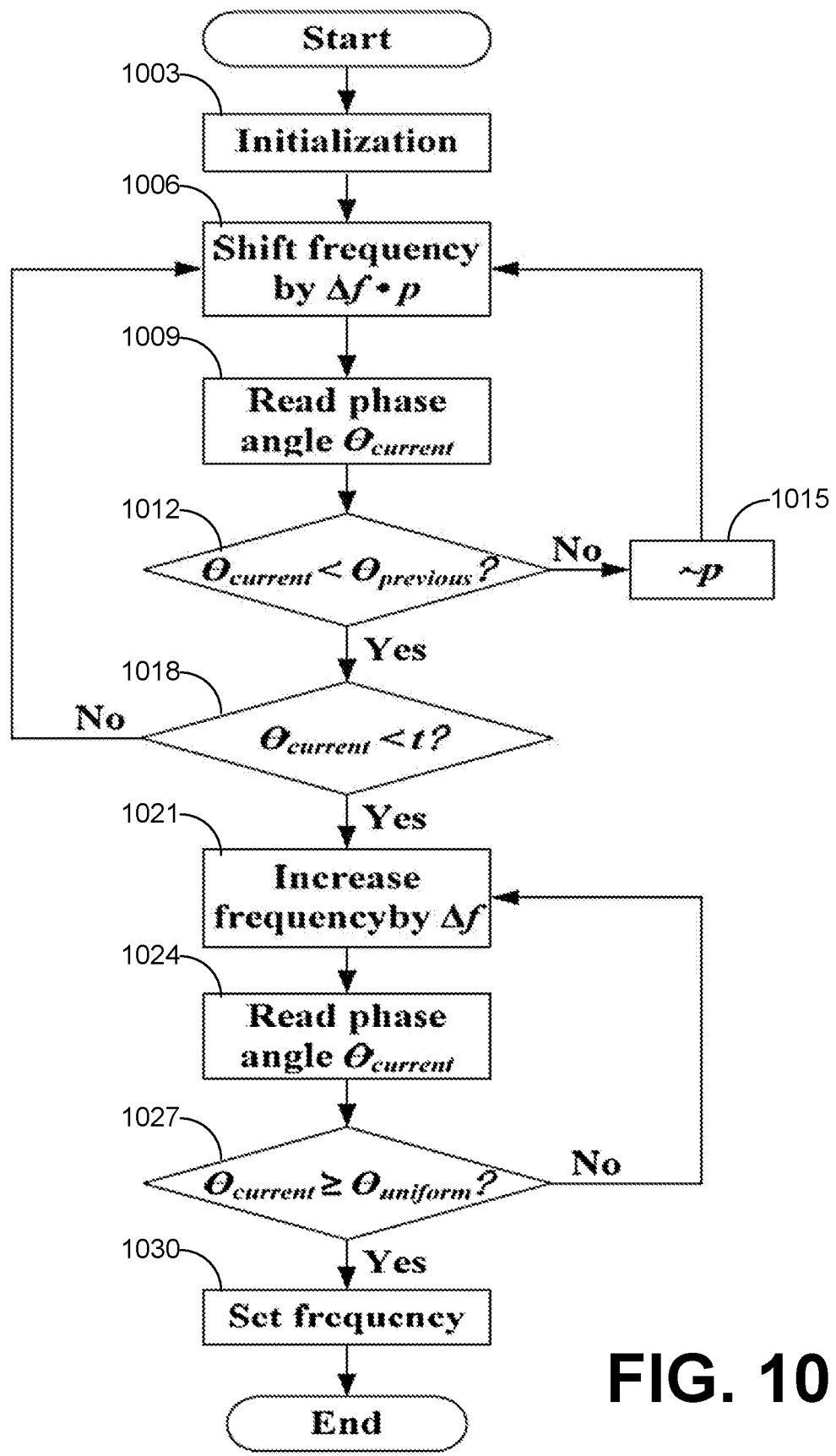
FIG. 10 is a flowchart illustrating an example of uniform-gain control tuning of the wireless charging system of FIG. 1, in accordance with various embodiments of the present disclosure.

FIG. 10 shows a flowchart illustrating an example of uniform-gain control tuning process. The WPT system searches for the resonant frequency for a specific alignment condition. The resonant frequency can be different each time a driver parks an EV. As shown in FIG. 10, the resonant frequency can be located through frequency shifting (Δfp) and phase-angle comparison between current and previous phase-angles ($\theta_{current}$ and $\theta_{previous}$). As the polarity of the phase angle cannot be detected by the measurement circuit, a direction flag p can be utilized in the firmware (or application) to determine whether to shift the frequency to larger or smaller frequencies. The phase-angle which corresponds to the resonant frequency is zero, but the phase-angle read by the primary controller 130 (or DSP controller 130a) at the resonant frequency is not exactly zero due to the measurement error of digital devices. Therefore, the resonant frequency can be set when the current phase-angle ($\theta_{current}$) is lower than an acceptable threshold t, where t is a value within the range of acceptable measurement accuracy.

This methodology is illustrated in the example of FIG. 10. After initialization at 1003, where the power source (or inverter) 106 is operated at an initial frequency and an initial phase-angle measurement can be obtained using the phase-angle measurement 130b. The initial frequency may be based upon the determined alignment of the primary and secondary coils 109 and 112, and/or based upon a determined height of the vehicle. At 1006, the frequency of the power source (or inverter) 106 is shifted by Δf*p. The frequency step size Δf and direction flag p can be set during the initialization at 1003. After the frequency shift, the current phase-angle $\theta_{current}$ is read at 1009 using the phase-angle measurement 130b.

If the current phase-angle $\theta_{current}$ is not less than the previous phase-angle $\theta_{previous}$, then the direction flag p is evaluated at 1015 to determine whether the operating frequency should be increased or decreased. The flow then returns to 1006, where the frequency is shifted based upon the direction flag. If the current phase-angle $\theta_{current}$ is less than the previous phase-angle $\theta_{previous}$, then $\theta_{current}$ is compared to the threshold t to determine if $\theta_{current}$ is acceptable. If $\theta_{current}$ is not less than the threshold, then the flow returns to 1006 where the frequency of the power source 106 is again shifted. Otherwise $\theta_{current}$ is acceptable and adjustment of the resonant frequency is complete.

In some implementations, the WPT system can then determine a uniform gain frequency once the resonant frequency is known. The tuning can increase the frequency step by step (Δf) while measuring the load phase-angle. The resonant frequency identified at 1015 determines the phase angle curve (see FIG. 9B) and the mutual inductance between the primary and secondary coils 109 and 112 can be calculated according to equation (16). Once the mutual inductance is known, the phase-angle for the uniform gain ($\theta_{uniform}$) can be obtained using equations (16) and (18). Then the primary controller 130 (or DSP controller 130a) can increase the switching frequency step by step (Δf) while measuring the current phase-angle ($\theta_{current}$) for the load until it is greater than and/or equal to $\theta_{uniform}$. Finally, the WPT sets the switching frequency of the power source (or inverter) 106 to the uniform gain frequency and raises the input DC voltage to begin charging the EV.

This uniform gain tuning is illustrated in the example of FIG. 10. After the resonant frequency is identified at 1018, then the frequency can be increased by Δf at 1021 and the current phase-angle $\theta_{current}$ determined at 1024. If $\theta_{current}$ is less than $\theta_{uniform}$ at 1027, then the flow returns to 1021 where the frequency is again increased by Δf. Otherwise, the current frequency is set at 1030 and the supplied voltage can be increased to proceed with the WPT. Theoretically, the calculation of the phase-angle $\theta_{uniform}$ for a known coupling can be derived from equations (16)-(18). However, such a calculation could dramatically consume the computational resources of the DSP controller 130a, and may influence the tuning speed as well. In addition, the theoretical value might have an error due to parasitic resistance and stray inductance in the electronic elements. Hence, the phase-angle $\theta_{uniform}$ can be calibrated for each increase in misalignment (e.g., a fixed incremental change such as 1 cm, 2 cm or other appropriate interval) and the coupling between two calibration points can be linearly mapped to the phase-angle $\theta_{uniform}$.

Range Detection Using Charging Coils. As discussed above, the phase-angle measurements can also be used for range detection. For an accurate measurement, a calibration is needed to build a data space that allows the resonant frequency to match with it. The built-in data space can be composed of a plurality of sets of misalignments (e.g., a defined number of sets such as, e.g., 10, 20, 25, 50 or other appropriate quantity) and resonant frequencies for each height. Since the vehicle chassis might be slightly varied due to tire pressure or the weight it carries, the height should be taken into account when building the data space, making it a multidimensional array. For example, the calibration can be conducted for each 1 cm interval so the total calibrated range is up to 25 cm for each height. Following FIG. 8B, the misalignment value can be assumed to change linearly with the measured resonant frequency f between two calibration points as close as possible. The calibration interval can be selected for the desired linear estimation accuracy. Hence, the misalignment L can be obtained using the following relationship:

$$L = L_i + \frac{f - f_i}{f_{i+1} - f_i}, i \in [0, D), \quad (19)$$

where i is the index number of the calibrated lateral distance $L_i$ between the primary and secondary coil centers, $f_i$ and $f_{i+1}$ are the resonant frequencies when the lateral distance is $L_i$ and $L_{i+1}$, and D is the number of intervals in the calibrated range (e.g., 25 with a 1 cm difference).

Figure 11A:
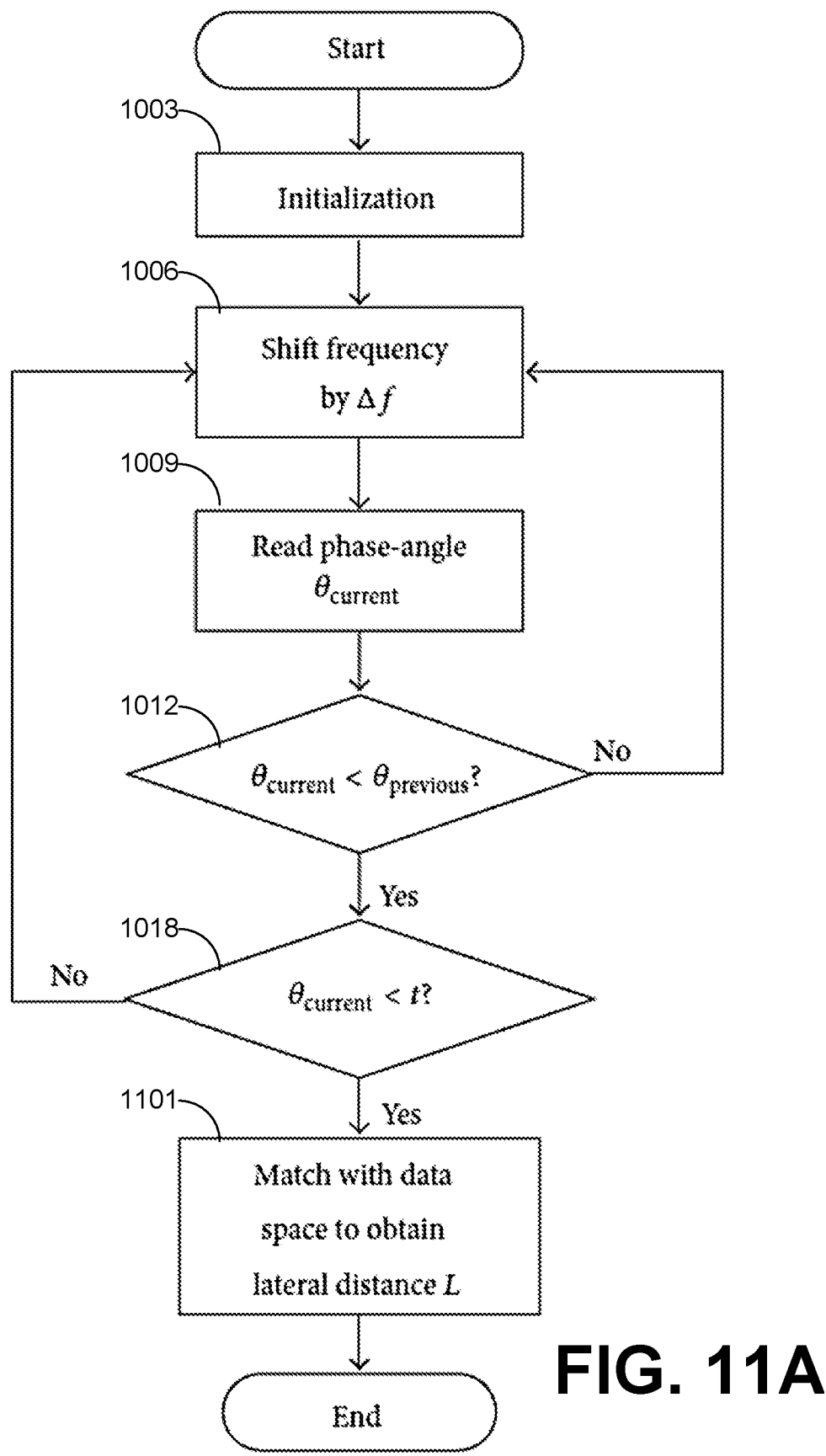
FIGS. 11A and 11B are flowcharts illustrating examples of alignment detection using lateral detection of the wireless charging system of FIG. 1, in accordance with various embodiments of the present disclosure.

FIG. 11A shows a flowchart illustrating an example for lateral detection. As in FIG. 10, the resonant frequency can be iteratively located through adjusting the frequency at 1006, reading the current phase-angle at 1009, and comparing between current and previous phase-angles ($\theta_{current}$ and $\theta_{previous}$) at 1012. The resonant frequency is obtained at 1018 when the current phase-angle ($\theta_{current}$) is lower than the threshold t, which is close to zero. After that, the primary controller 130 can match the resonant frequency with the built-in data space at 1101 and calculate the lateral distance using equation (19). The calibration data can also include phase-angle information ($\theta_{uniform}$) that can be used for the uniform gain tuning described with respect to FIG. 10.

Figure 11B:
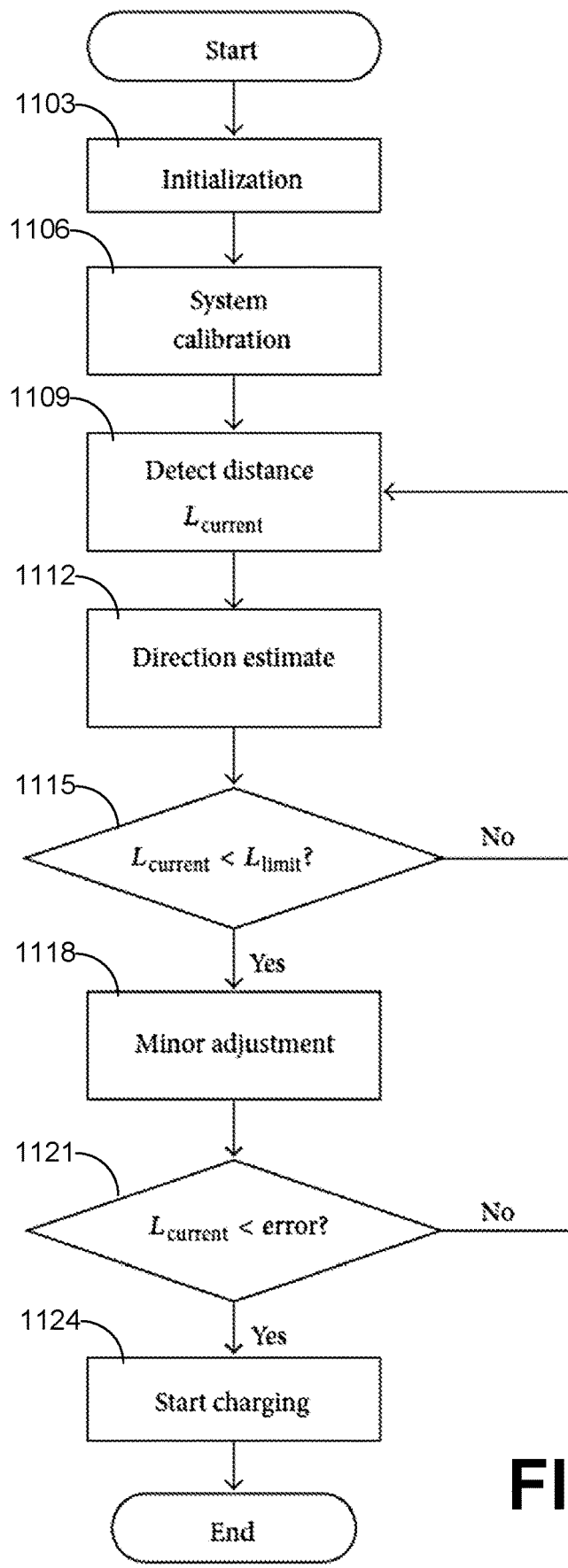

Referring next to FIG. 11B, shown is an example of an operation plan for alignment detection using lateral detection. When the vehicle is parked, the alignment system can be automatically activated from a sleep mode. After initialization at 1103, the primary side determines the vehicle height (e.g., using an ultrasonic sensor) and then calibrates at 1106 and chooses the appropriate built-in data array for matching purposes. At 1109, the immediate lateral distance $L_{current}$ and the auxiliary coil outputs are measured, and can be displayed, for direction estimation at 1112. The current lateral distance $L_{current}$ is compared to the previous lateral distance or a misalignment limit $L_{limit}$ at 1115 to determine whether it is time to alert the driver to start minor adjustments of the vehicle. If the lateral distance does not satisfy the misalignment limit, then the flow returns to 1109 to continue monitoring the lateral distance $L_{current}$.

If the misalignment limit is satisfied at 1115, then the vehicle driver can be notified through the driver interface 127 (FIG. 1) to begin minor adjustment of the vehicle at 1118 to align the primary and secondary coils 109 and 112 for charging. The alignment detection utilizing the auxiliary coils 139 can be used to provide feedback to the driver for final adjustment of the vehicle position. If the lateral distance $L_{current}$ falls within an acceptable error at 1121, then the charging process can start at 1124. If not, then the flow returns to 1109 to continue monitoring the lateral distance $L_{current}$. The charging process can be initiated at 1124 after both the charging pads are well aligned and the driver shifts into park and locks the transmission.

Figure 12:
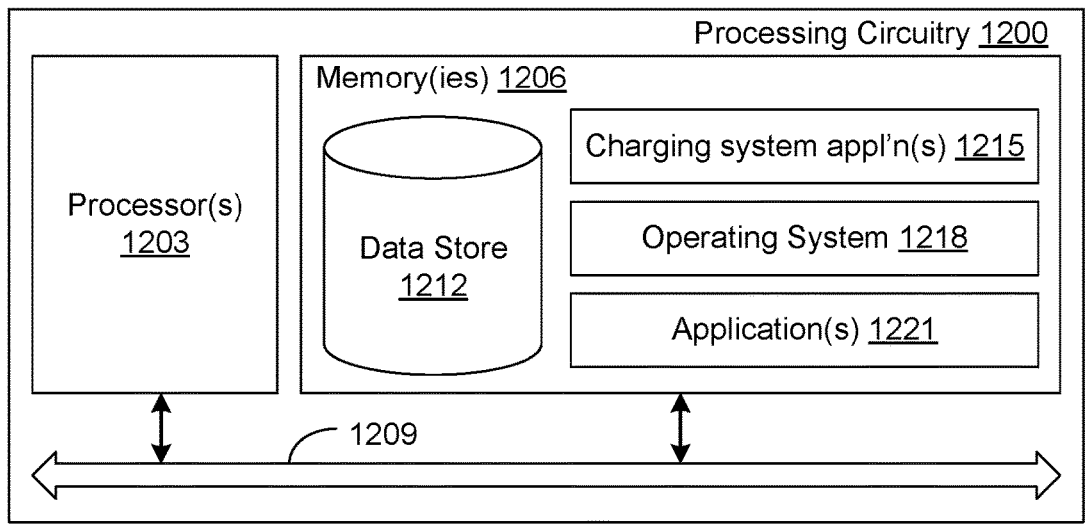
FIG. 12 is a schematic block diagram that illustrates an example of processing circuitry employed in the fuel cell system of FIG. 1 in accordance with various embodiments of the present disclosure.

With reference now to FIG. 12, shown is a schematic block diagram of an example of processing circuitry 1200 that may be used to implement various portions of the primary and secondary controllers of the wireless charging system 100 of FIG. 1 in accordance with various embodiments of the present disclosure. The processing circuitry 1200 can include at least one processor circuit, for example, having a processor 1203 and a memory 1206, both of which are coupled to a local interface 1209. To this end, the processing circuitry 1200 may be implemented using one or more circuits, one or more microprocessors, microcontrollers, application specific integrated circuits, dedicated hardware, digital signal processors, microcomputers, central processing units, field programmable gate arrays, programmable logic devices, state machines, or any combination thereof. The local interface 1209 may comprise, for example, a data bus with an accompanying address/control bus or other bus structure as can be appreciated. The processing circuitry 1200 can be communicatively coupled with a display 127 for rendering of generated graphics such as, e.g., a user interface and an input interface such, e.g., a keypad or touch screen to allow for user input. In addition, the processing circuitry 1200 can include communication interfaces such as a radio 133 or other appropriate interface that allow the processing circuitry 1200 to communicatively couple with other communication devices. The communication interfaces may include one or more wireless connection(s) such as, e.g., Bluetooth®, WiFi, or other radio frequency (RF) connection and/or one or more wired connection(s).

Stored in the memory 1206 are both data and several components that are executable by the processor 1203. In particular, stored in the memory 1206 and executable by the processor 1203 are charging system application(s) 1215 which can facilitate alignment of the charging coils 109 and 112 (FIG. 1) and charging of the vehicle systems, an operating system 1218, and/or other applications 1221. The charging system applications can include applications that support, e.g., the primary controller 130 (FIG. 1) and/or secondary controller 115a (FIG. 2C) for control of the operation of the wireless charging system 100. It is understood that there may be other applications that are stored in the memory 1206 and are executable by the processor 1203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, LabVIEW® or other programming languages.

The flowcharts of FIGS. 6 and 10-11B illustrate examples of architecture, functionality, and operation of a possible implementation of the charging system application(s) 1215. In this regard, each block can represent a module, segment, or portion of code, which comprises one or more executable instructions for implementing the specified logical function(s). It should also be noted that in some alternative implementations, the functions noted in the blocks may occur out of the order noted in FIGS. 6 and 10-11B. For example, two blocks shown in succession in FIGS. 6 and 10-11B may in fact be executed substantially concurrently or the blocks may sometimes be executed in the reverse order, depending upon the functionality involved.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and the memory 1206 may represent multiple memories 1206 that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the charging system application(s) 1215, the operating system 1218, application(s) 1221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the charging system application(s) 1215 and/or application(s) 1221, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Experimental Validation

Figure 13:
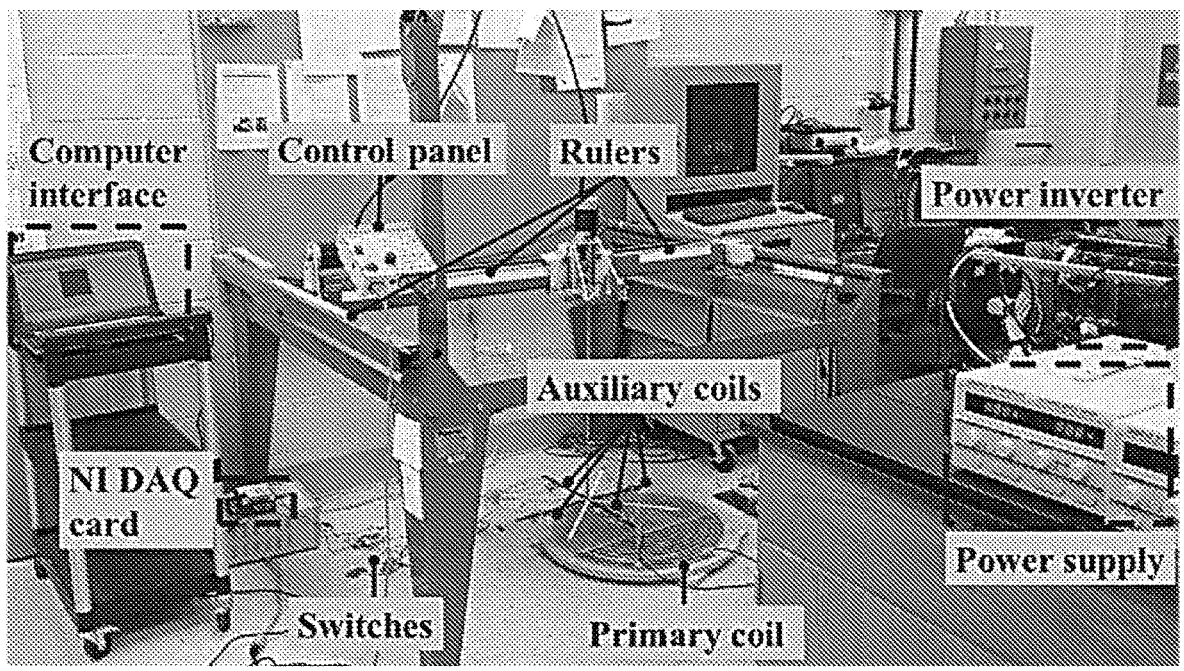
FIG. 13 is an image depicting a test setup used for validation of the alignment detection of the wireless charging system of FIG. 1, in accordance with various embodiments of the present disclosure.

Referring now to FIG. 13, shown is an image of an experimental platform used for validation of the alignment detection of the primary and secondary coils 109 and 112 of the wireless charging system of FIG. 1. The setup included a three-axis motorized platform is modified from a CNC machine (DHC, PlasmaCAM, Inc., Colorado City, Colo., USA) to test the alignment estimation approach. The secondary pad (or coil) 112 with the auxiliary coils 139 attached was mounted on the platform while the primary coil 109 was placed on ground. The traveling path of the secondary coil could be programmed on the machine computer or manually operated by the control panel in FIG. 13. The test platform could move horizontally in a 1.2 m×1.2 m plane and vertically in a 0.6 m range. The maximum allowed speed was 25 m/min in a horizontal direction and 2 m/min in a vertical direction. The dimensions of the platform were 1.75 m in width, 1.65 m in height, and 1.65 m in depth.

The power inverter in FIG. 13 was used to drive the primary coil 109 to produce a magnetic field for the auxiliary coils 139 to pick up. The inverter DC input was set at 5V to operate under a low power condition during the alignment process and to generate a weak magnetic field of <15 µT throughout the charging zone because of EM safety considerations of living things. An NI CompactRIO-9074 was applied to acquire the sensing signals. The positioning search algorithm was run in MATLAB using LabVIEW Mathscript. A LabVIEW program was developed to analyze, extract, display, and record the signals and position. During the experiments, the position and related voltages were stored into an excel file whenever the LabVIEW received inputs and/or operation orders from users. 108 position samples from air gaps of 9 cm to 14 cm were measured in the experiment. The samples were distributed on range of 0-70 cm with both 0 and 10 cm misalignment in the horizontal plane.

Figure 14A:
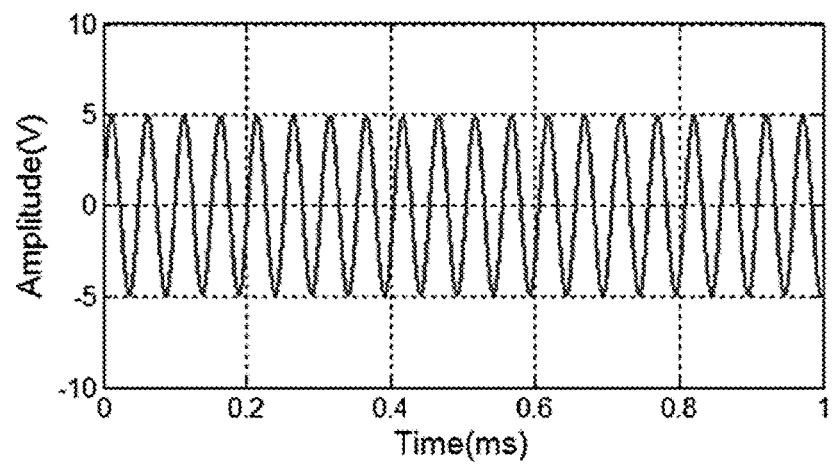
FIGS. 14A-14C, 15A-15F, 16 and 17A-17B illustrate experimental results for evaluation of the alignment detection using auxiliary coils, in accordance with various embodiments of the present disclosure.
Figure 14A:
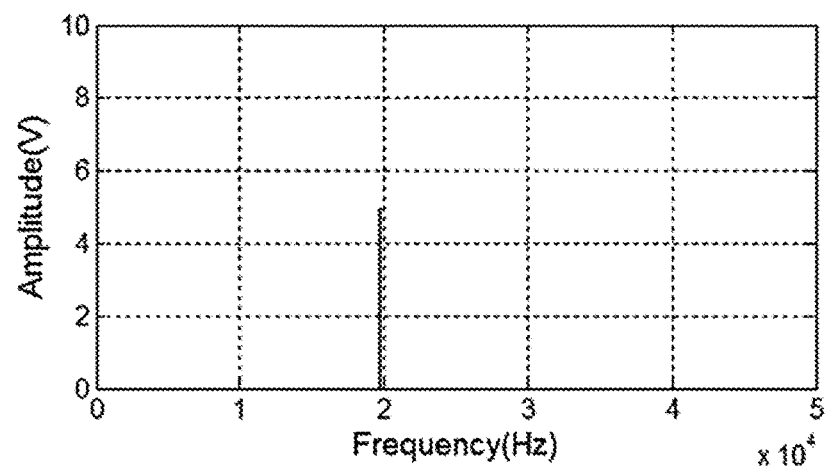

Sensor Testing. The high accuracy and repeatability of the sensing elements play a major role in the overall successful measurement. FIG. 14A shows plots of the time domain and frequency domain outputs of the sensing circuit of FIG. 4A. The sensor output in both time and frequency domains were obtained using NI LabVIEW under a 10 cm air gap with the auxiliary coil 139 coaxial with the primary axis of the primary coil 109. The signal spectrum shows that the output comprises a single frequency component at 19.8 kHz, showing that possible noise in other frequencies was filtered and the sensor output is low in noise. The signal amplitude was close to the simulation result, which was around 5.2V as shown in FIG. 4B.

Figure 14B:
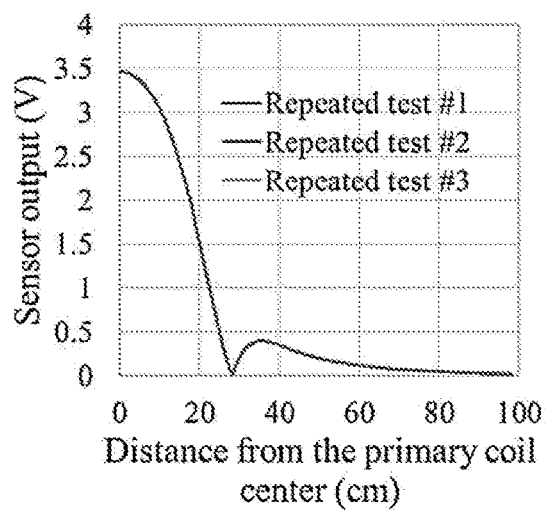
Figure 14C:
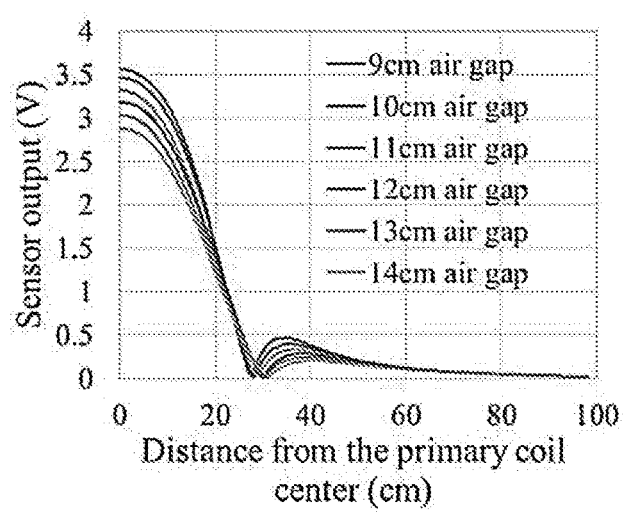

The sensor nodes were also tested throughout the whole measurement range of 99 cm, with a 1 cm increment. FIG. 14B shows the output voltage curves for 3 trials with a constant air gap of 10 cm, which are highly coincided, and FIG. 14C shows the output voltage curves for multiple air gaps ranging from 9 cm to 14 cm. The maximum relative repeatability error is <4.1% for all the 100 positions, indicating the sensor has high repeatability. The relative repeatability error was defined as the difference between the maximum and minimal voltages divided by the mean value of the three trials under the same conditions.

According to FIG. 14B, the derivative of the curves reached the maximum value 0.235V/cm when the lateral distance from the primary coil center was 19 cm, which coincides well with the FEA in FIG. 3C. The maximum slope allows the auxiliary coils 139 to have the highest detection resolution when the distance from the primary coil center is 19 cm. As previously discussed, the placement of the auxiliary coils 139 follows the maximum slope theory to let the system have highest sensitivity when the primary and auxiliary coils 109 and 139 are close to perfect alignment.

FIG. 14C shows the testing curves under air gaps in a range of 9-14 cm. According to FIG. 14C, the auxiliary coil output voltage becomes larger around the primary coil center along with a decrease of the air gap. The sensor output drops to zero when the distance from the center is around 28 cm, which is right over the primary coil edge. Since the field direction is reversed inside and outside the primary coil edge, the overall magnetic flux going through the surface of auxiliary coil can be zero around the edge and thus the output voltage can be zero.

Figure 15A:
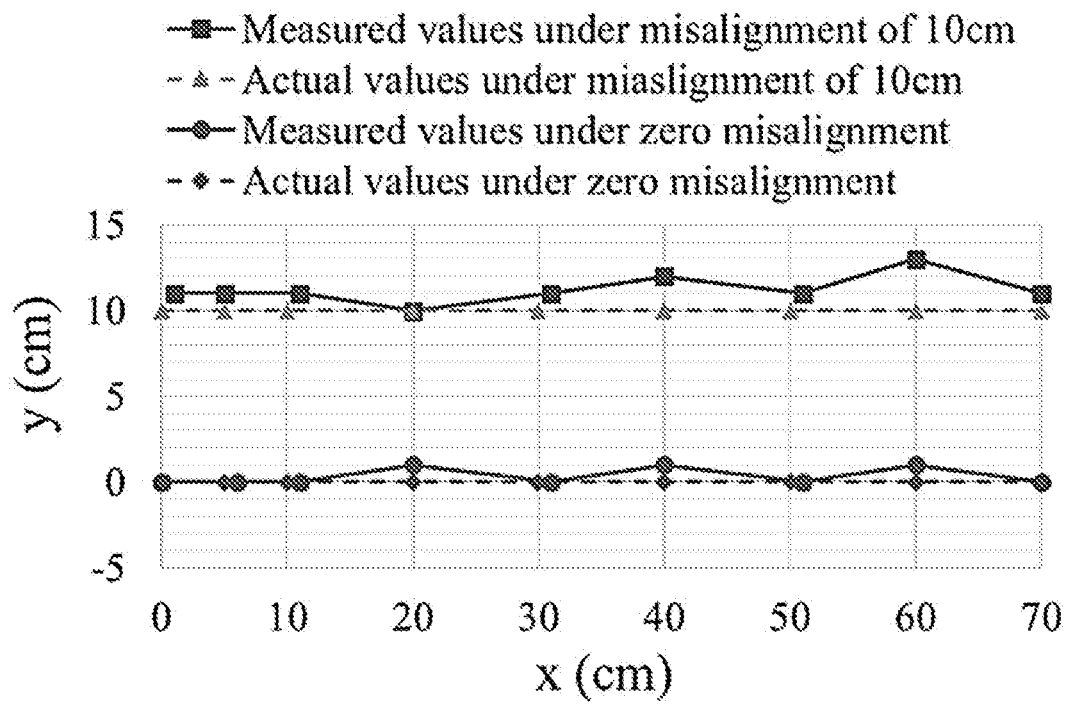
Figure 15B:
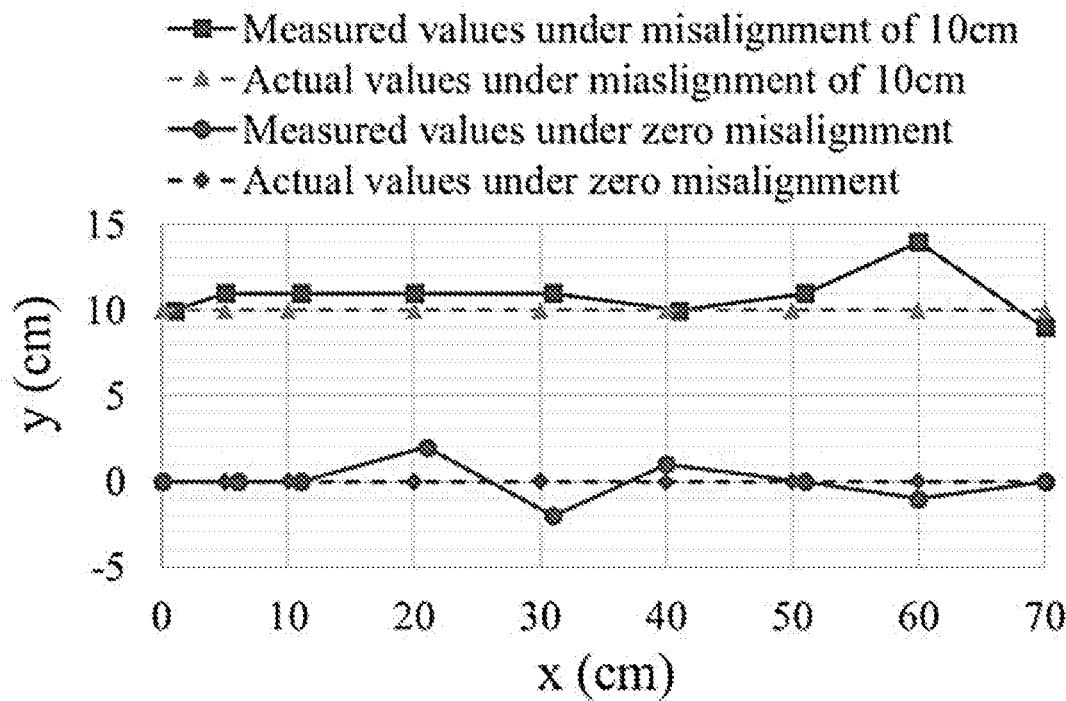
Figure 15C:
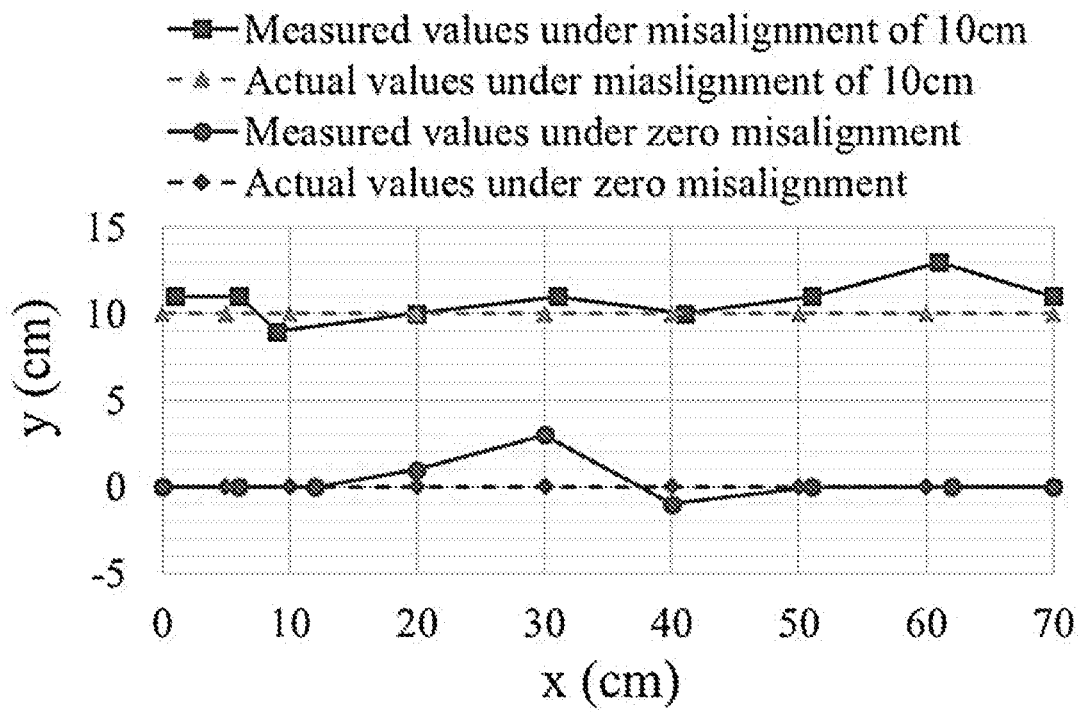
Figure 15D:
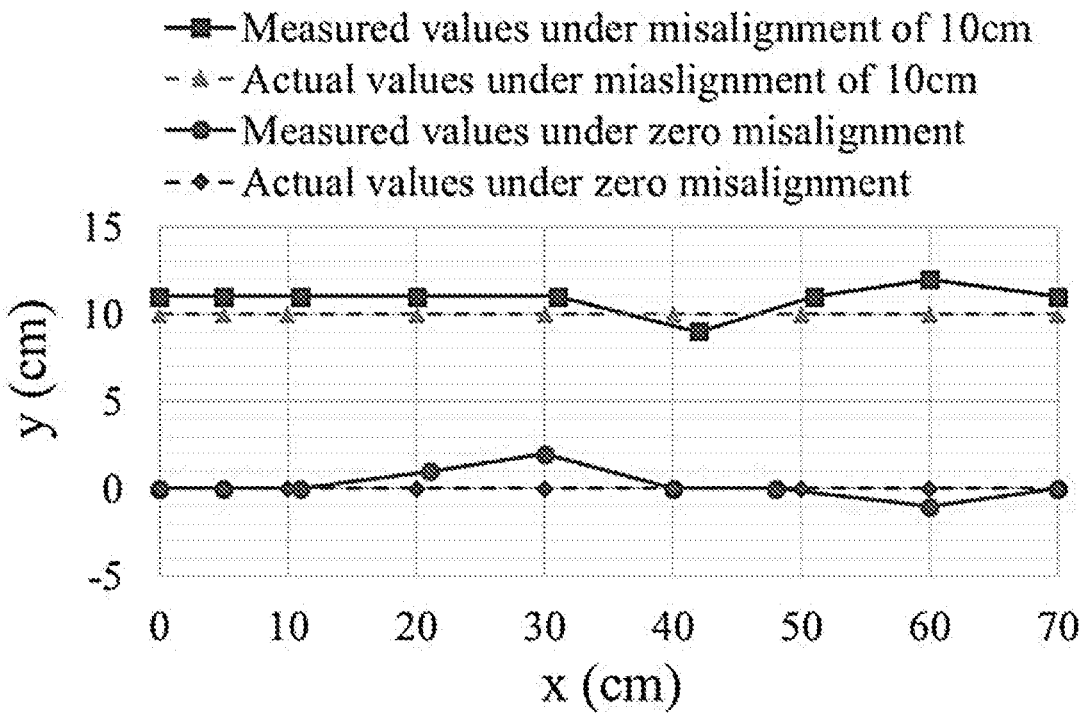
Figure 15E:
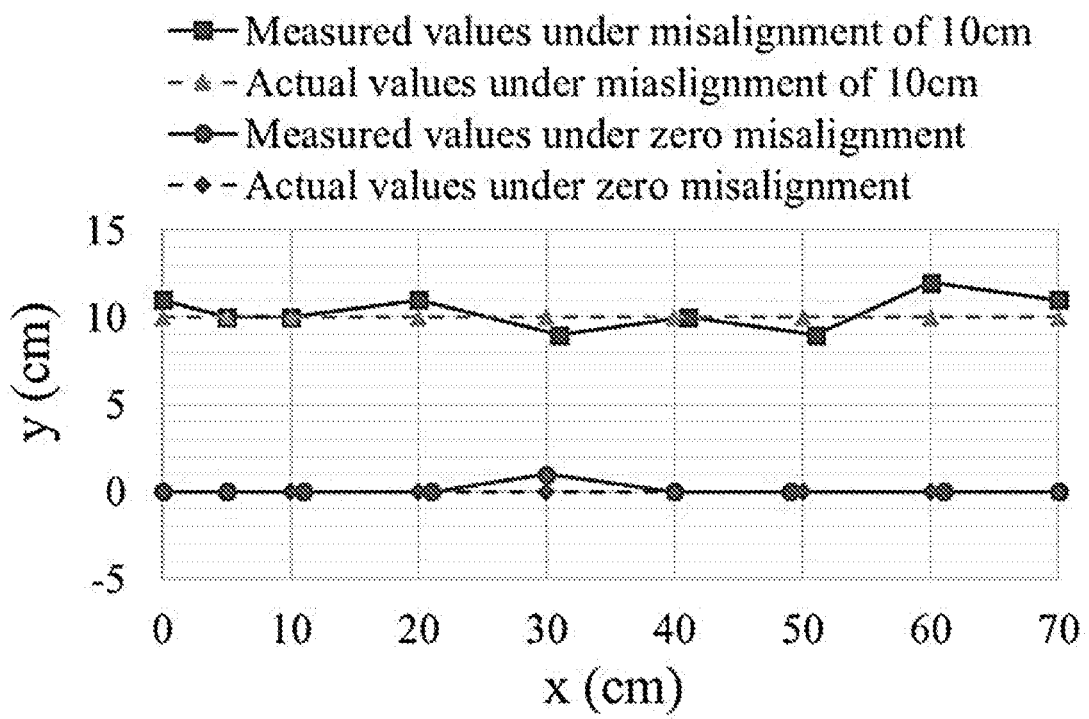
Figure 15F:
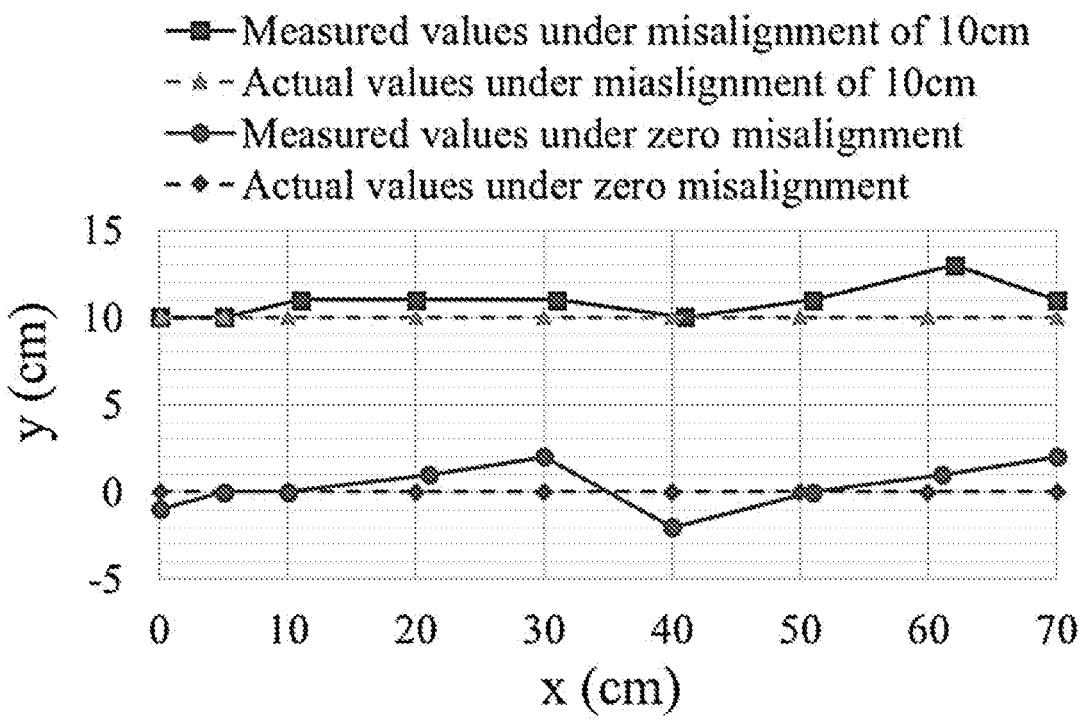

Magnetic Alignment Evaluation. FIGS. 15A-15F are plots illustrating the comparison of actual and measured coordinates under different air gaps. 108 position samples were tested to validate the accuracy of the alignment system. These samples are taken from multiple air gap and alignment conditions. FIG. 15A had an air gap of 9 cm, FIG. 15B had an air gap of 10 cm, FIG. 15C had an air gap of 11 cm, FIG. 15D had an air gap of 12 cm, FIG. 15E had an air gap of 13 cm and FIG. 15F had an air gap of 14 cm. The error in FIGS. 15A-15F ranges from 0.2 cm to 4.3 cm throughout the 108 samples. The curves in FIG. 14C are almost overlapped when the sensor distance is greater than 50 cm (where all four nodes have close responses), which will influence the detection range. Hence, a maximum detection range was set at 70 cm in FIGS. 15A-15F.

The measurement error was less than 1 cm across FIGS. 15A to 15F when the lateral displacement x is approaching zero, indicating the system has higher alignment accuracy when the primary and secondary coils 109 and 112 are well aligned. This may be attributed to the magnetic fields being stronger, which generates a higher sensor output when they are closer to the center of the primary coil 109. A larger auxiliary coil output can increase the resolution over distance, leading to a more accurate alignment evaluation at the zero misalignment condition. FIGS. 15A-15F also indicate that the positioning method can meet the alignment detection requirement for efficient wireless charging, considering the maximum allowed misalignment is 10 cm as stated above.

Figure 16:
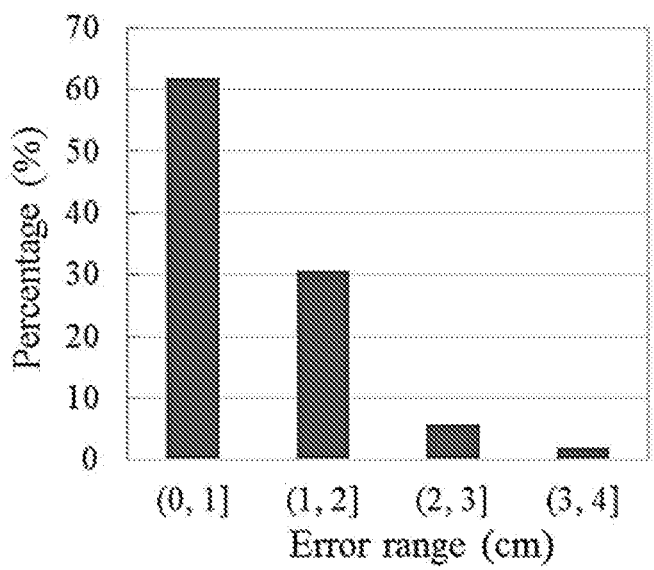

According to FIG. 16, 62% of the 108 samples had a measurement error of less than 1 cm, 30.5% had an error of between 1 cm and 2 cm, 5.6% were from 2 cm to 3 cm, and 1.9% were from 3 cm to 4 cm, showing that over 98% of the sample errors were not more than 3 cm for a misalignment range up to 70 cm and a gap variation from 9 cm to 14 cm.

Figure 17A:
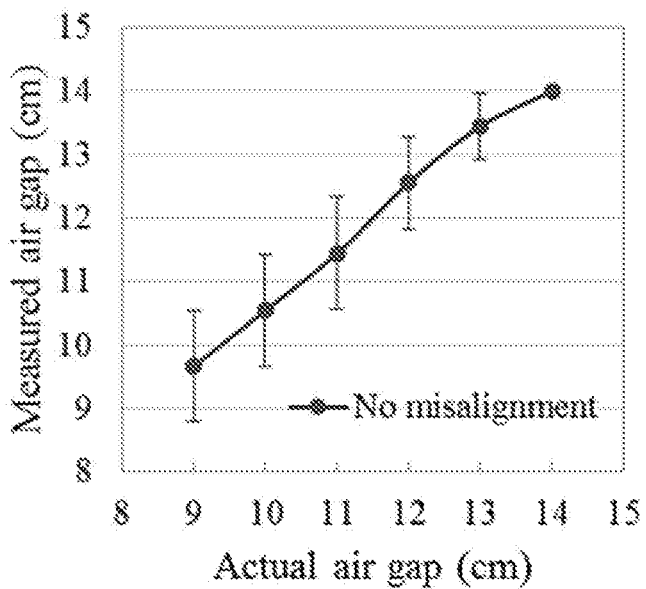
Figure 17B:
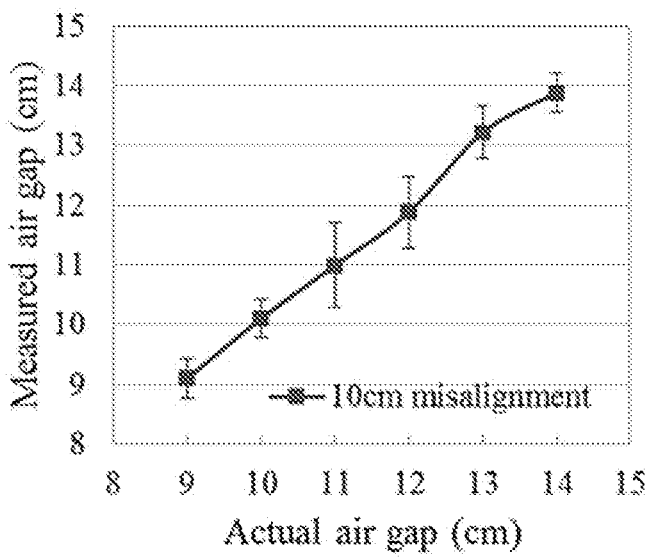

Air Gap Measurement. FIGS. 17A and 17B show the comparison results between measured and actual air gaps under zero and 10 cm misalignment conditions. The measured air gap was the average gap of 9 samples along x axis. As shown in FIG. 17A, the measured air gap was 9.6 (SD=0.87), 10.5 (SD=0.88) 11.4 (SD=0.88), 12.5 (SD=0.72), 13.4 (SD=0.52), 14 (SD=0) when the misalignment is zero and the actual air gap is 9, 10, 11, 12, 13, and 14 cm separately. When the misalignment was set at 10 cm to repeat the measurement, the measured air gap was 9.1 (SD=0.33), 10.1 (SD=0.33), 11 (SD=0.70), 11.9 (SD=0.60), 13.2 (SD=0.44), and 13.9 (SD=0.33) in FIG. 17B. All the measurement errors of the above configurations are within 0.6 cm. As the data was acquired with an incremental step of 1 cm during the calibration, the maximum measurement error of 0.6 cm is reasonable.

Figure 18A:
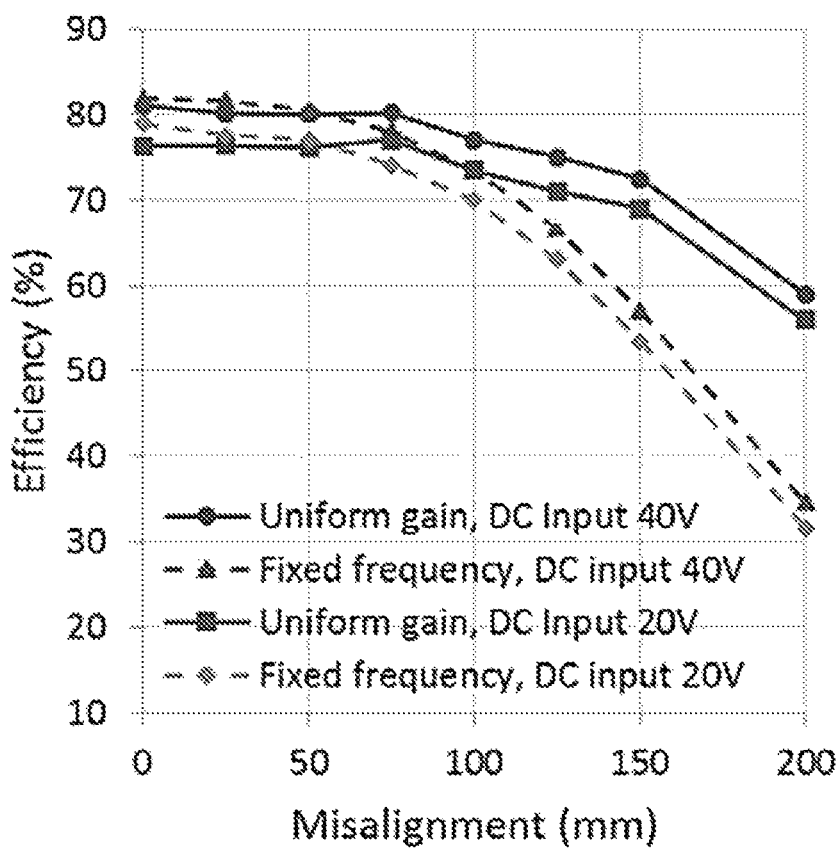
FIGS. 18A and 18B illustrate experimental results for evaluation of the gain control, in accordance with various embodiments of the present disclosure.
Figure 18B:
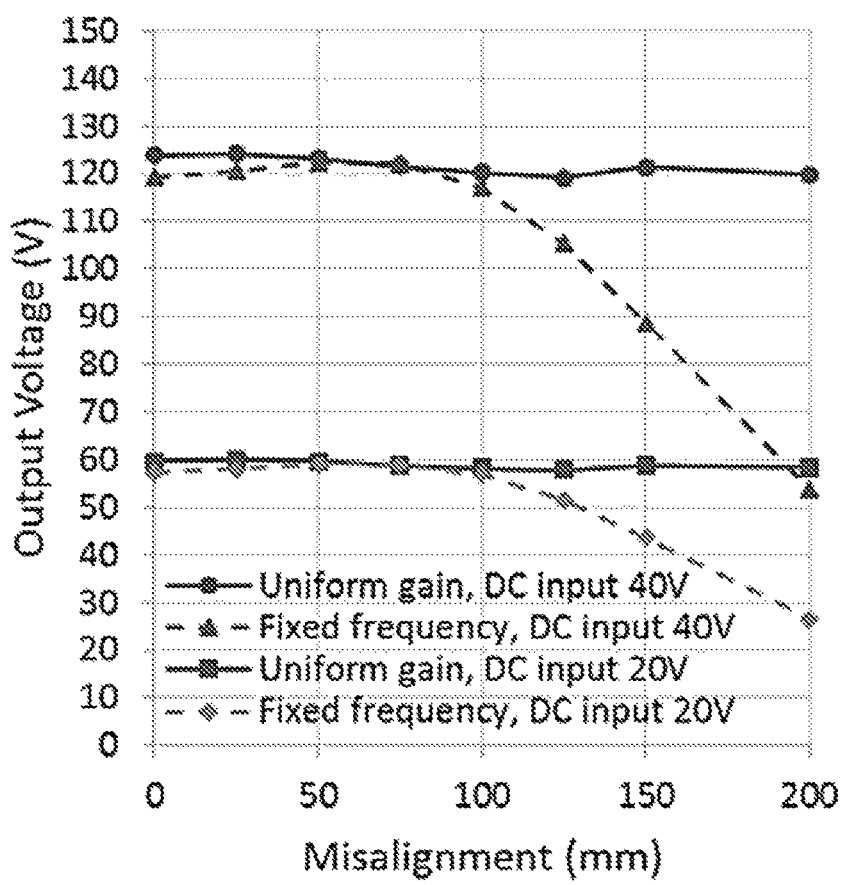

Gain Control Comparison with Misalignment. FIGS. 18A and 18B show the efficiency and gain curves, respectively, under fixed frequency and uniform gain control. The experiment was conducted under a DC input voltage of 20V and 40V separately. The uniform gain control was better than fixed frequency control in both output voltage and efficiency, especially when the misalignment is larger than 75 mm. The voltage variation of uniform gain control was within 3.3% across the misalignment range of up to 200 mm, while it is 57.2% for the same misalignment range under fixed frequency control. The efficiency drop of uniform gain control was 27.2% when the misalignment changes from 0 to 200 m and the DC input is 40V, which is much lower than that of fixed frequency control for the same experimental conditions (57.8%).

While the voltage gain under fixed frequency control began to vary significantly at a misalignment of >100 mm, the gain (G=$V_b/V_1$, where $V_b$ is the secondary output after rectification) was maintained at about 3.04 across the misalignment range up to 200 mm, which was quite close to the simulation result. The theoretical peak-peak voltage gain of 4.0 (FIG. 9C) equals 3.27 when taking the rectification into account. Note that the DC output voltage $V_b$ after the rectifier was the rectifier input RMS voltage $V_{rms}$ multiplied by a constant value: $V_2$=(3.2)$V_b$.

Figure 19A:
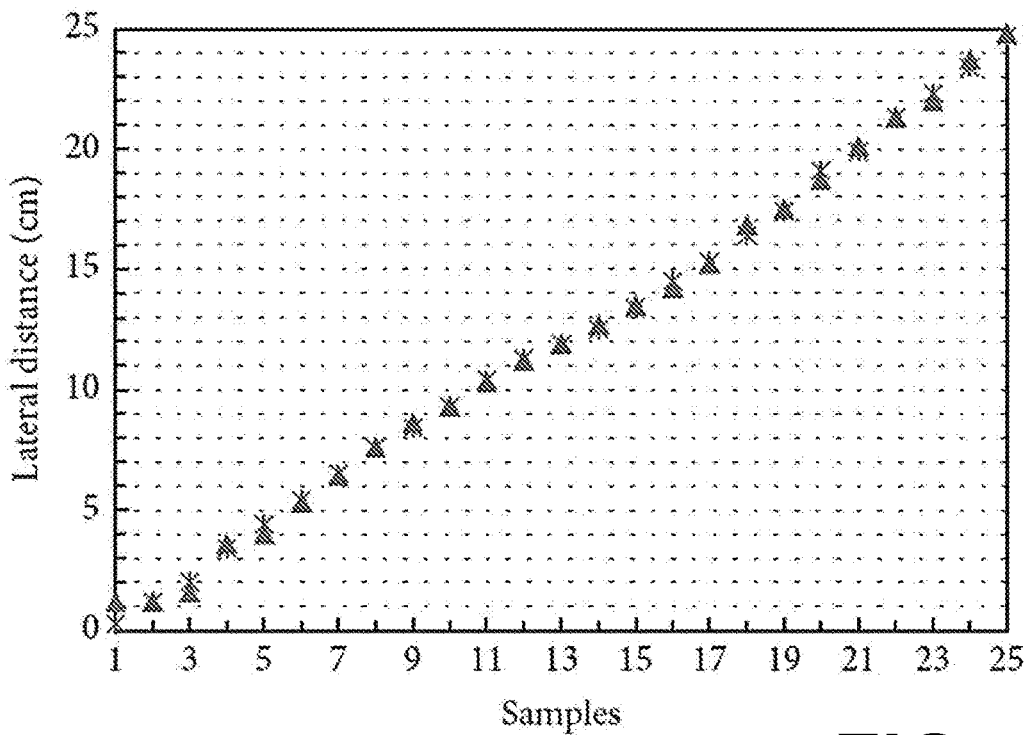
FIGS. 19A-19B and 20A-20B illustrate experimental results for evaluation of the lateral distance detection using the primary coil, in accordance with various embodiments of the present disclosure.
Figure 19B:
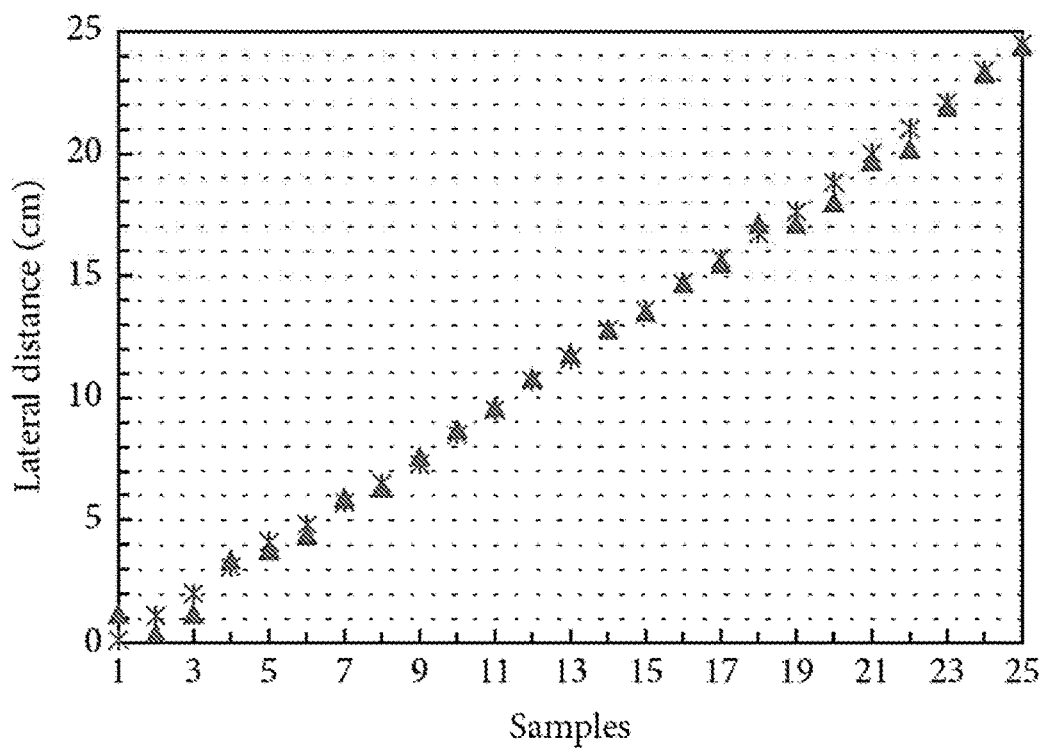

Lateral Distance Detection. FIGS. 19A and 19B show the experimental comparison between measured values by the charging electronics and the true values across the measurement range. FIG. 19A provides the experimental results when the coil air gap was 12 cm and FIG. 19B provides the results when the gap was 11.5 cm. The mean error was 0.2 cm in FIG. 19A while the mean error was 0.34 cm in FIG. 19B. As the system was calibrated with an air gap of 12 cm, the system showed more accurate measurement at 12 cm than at 11.5 cm. The measurement error was relatively higher when the two coils were very close together (<2 cm). This may be attributed to the magnetic coupling being similar when the two coils are almost strictly aligned. In this case, the resonant frequency of the WPT system varied little, making the system have relatively low sensitivity when the primary and secondary coils 109 and 112 were in close to perfect alignment. Since the wireless charging system 100 (FIG. 1) can endure some misalignment, the alignment can still meet the charging needs as long as the alignment error is less than 10 cm for a common wireless EV charger.

Figure 20A:
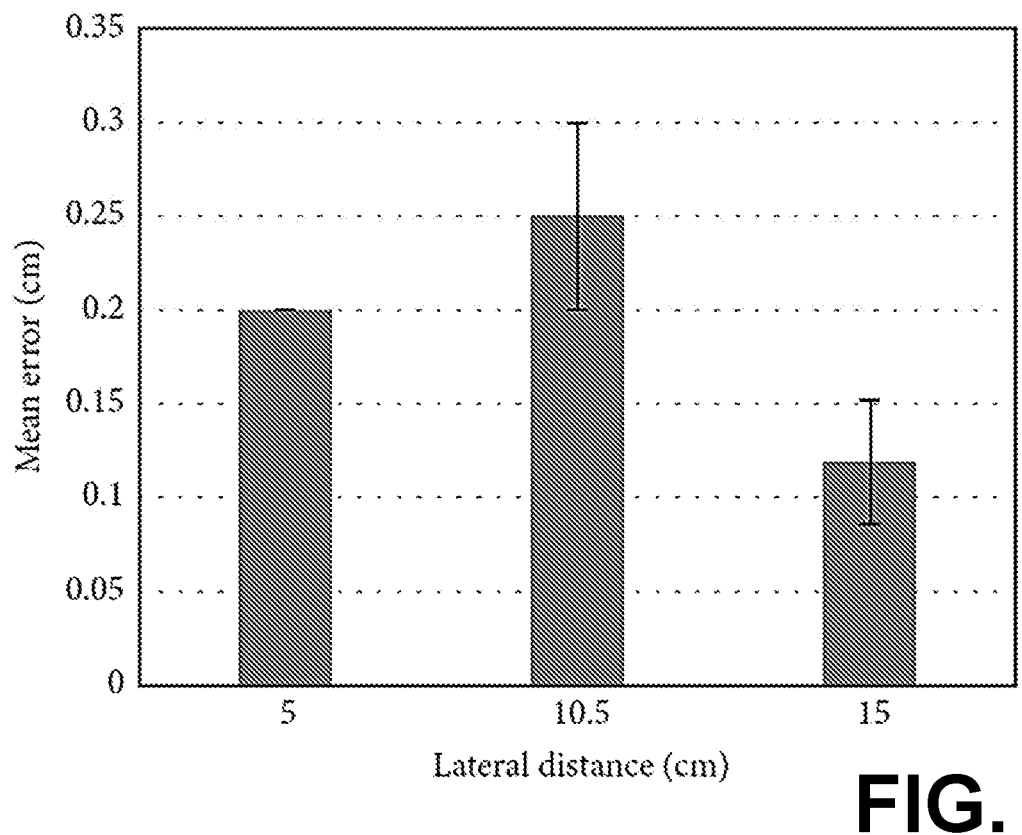

FIG. 20A shows the measurement accuracy of the alignment system when the lateral distance between the primary and secondary coils 109 and 112 was 5 cm, 10.5 cm, and 15 cm, and with a chassis height of 11.5 cm. The measurement was repeated 10 times for each lateral distance. The mean error was 0.2 cm (STD=0) at the misalignment of 5 cm, 0.25 cm (STD=0.05) at 10.5 cm, and 0.12 cm (STD=0.03) at 15 cm. These data show that the system has a high measurement repeatability.

Figure 20B:
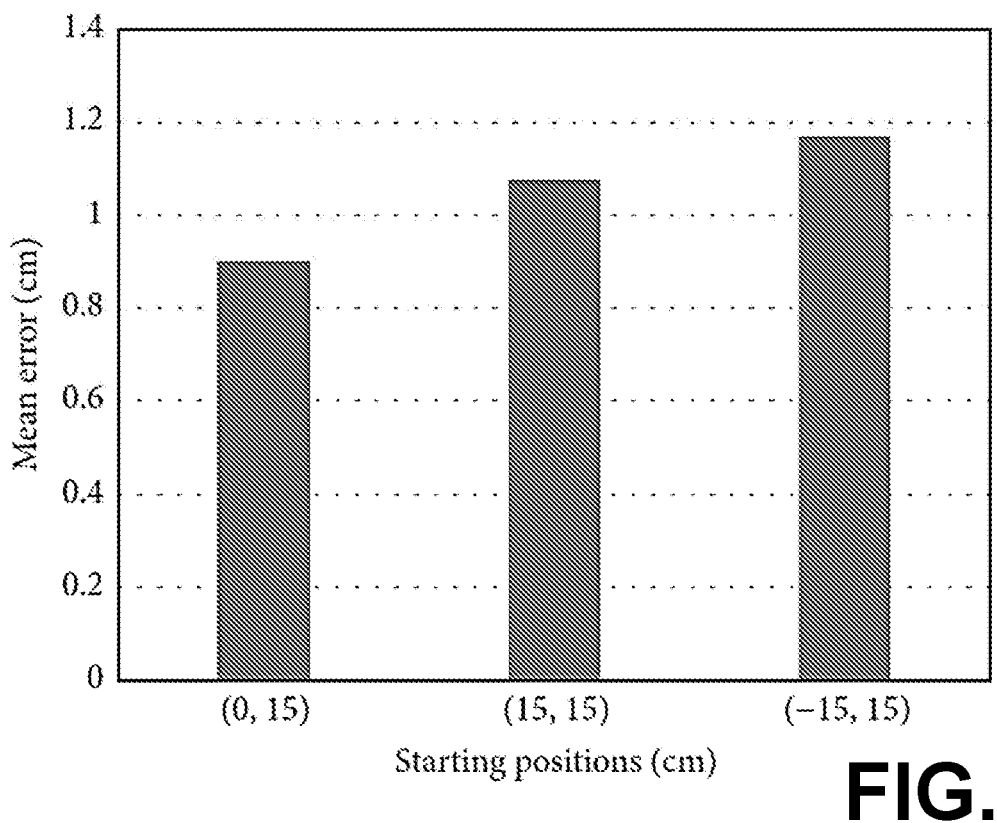

Minor Adjustment with Auxiliary Coils. FIG. 20B shows the positioning accuracy between the two well aligned charging coils 109 and 112 with assistance from the four auxiliary coils 139. The experiment was repeated three times for each starting position, and with a chassis height of 11.5 cm. The mean error was 0.9 cm when the coordinate of the starting point was (0, 15), 1.1 cm for (15, 15), and 1.2 cm for (−15, 15). Since the (0, 15) starting point was located on the y-axis, the error as slightly smaller than the other two conditions whose starting positions were in the first and second quadrants, respectively. All three mean errors were lower than 1.2 cm, which is within the acceptable range of misalignment in wireless EV charging.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A wireless charging system for electric vehicles, comprising:
   a transmitter pad including a primary coil supplied by a power source; and
   alignment control circuitry configured to determine an alignment condition of the transmitter pad with respect to a receiver pad of an electric vehicle, wherein the alignment condition is based upon a phase-angle between a voltage supplied to the primary coil by the power source and a current flowing through the primary coil.

2. The wireless charging system of claim 1, wherein the alignment control circuitry is configured to set a resonant operating frequency of the power source based at least in part upon the alignment condition.

3. The wireless charging system of claim 2, wherein the alignment control circuitry determines a lateral distance between a center of the primary coil and a center of a secondary coil of the receiver pad based upon the resonant operating frequency.

4. The wireless charging system of claim 1, wherein the alignment control circuitry iteratively adjusts an operating frequency of the power source until the phase-angle satisfies a threshold condition.

5. The wireless charging system of claim 4, wherein the alignment control circuitry further adjusts the operating frequency of the power source to maintain a uniform voltage gain at an output of the receiver pad.

6. The wireless charging system of claim 4, comprising a phase-angle measurement circuit configured to generate a DC (direct current) output proportional to the phase-angle between the voltage and the current.

7. The wireless charging system of claim 1, wherein determining the alignment condition comprises measuring the alignment condition at different operating frequencies of the power source.

8. A wireless charging system for electric vehicles, comprising:
   a receiver pad of an electric vehicle, the receiver pad comprising a secondary coil and a plurality of auxiliary coils distributed about the receiver pad, the plurality of auxiliary coils comprising at least three separate auxiliary coils positioned at a fixed radial distance from and distributed about a center of the secondary coil; and alignment processing circuitry configured to determine an alignment condition of the receiver pad with respect to a transmitter pad comprising a primary coil supplied by a power source, the primary coil configured to generate a magnetic field distribution exhibiting a radial rate of change along a radius extending from a center of the primary coil, where the alignment condition is determined by the alignment processing circuitry based at least in part upon outputs of each of the at least three separate auxiliary coils produced by the magnetic field distribution.

9. The wireless charging system of claim 8, wherein the plurality of auxiliary coils consist of four separate auxiliary coils positioned at the fixed radial distance from and equally distributed about the center of the secondary coil.

10. The wireless charging system of claim 9, wherein the fixed radial distance from the center of the secondary coil corresponds to a radial distance along the radius extending from the center of the primary coil to where the magnetic field distribution exhibits a greatest radial rate of change.

11. The wireless charging system of claim 8, wherein the alignment condition is based at least in part upon comparison of measured outputs of the plurality of auxiliary coils.

12. The wireless charging system of claim 8, wherein each of the plurality of auxiliary coils are individually fabricated on a separate printed circuit board (PCB).

13. The wireless charging system of claim 12, wherein the PCB comprises an amplifier configured to amplify an output of the auxiliary coil on that PCB.

14. The wireless charging system of claim 8, wherein the receiver pad comprises an ultrasonic sensor configured to measure height between the receiver pad and a surface under the receiver pad.

15. A method for aligning a wireless charging system for vehicle charging, comprising:
  measuring output voltages of a plurality of auxiliary coils mounted on a secondary coil located over a primary coil of the wireless charging system;
  determining a lateral misalignment between the primary and secondary coils based at least in part upon the output voltages;
  measuring a phase-angle between a voltage and a current supplied to the primary coil by a power source; and
  adjusting an operating frequency of the power source supplying based at least in part upon a comparison of the phase-angle with a threshold value.

16. The method of claim 15, comprising:
  adjusting a position of the secondary coil based upon the lateral misalignment.

17. The method of claim 16, wherein the lateral misalignment is based upon reducing a magnitude of a difference between the measured output voltages and a voltage vector corresponding to a secondary coil position to within a defined threshold.

18. The method of claim 15, wherein the phase-angle is measured after the secondary coil is aligned over the primary coil within a defined lateral tolerance.

19. The method of claim 15, wherein the operating frequency of the power source is iteratively adjusted until the phase-angle satisfies a threshold condition.

20. The method of claim 15, wherein the plurality of auxiliary coils comprises at least three separate auxiliary coils equally distributed about a center of the secondary coil.

* * * * *